United States Patent [19]

Kunimori et al.

[11] Patent Number: 5,754,629
[45] Date of Patent: May 19, 1998

[54] INFORMATION PROCESSING SYSTEM WHICH CAN HANDLE VOICE OR IMAGE DATA

[75] Inventors: Yoshihiko Kunimori, Hiratsuka; Toshio Kamimura, Fujisawa; Tomochika Ozaki, Yokohama; Takao Iwatani, Fujisawa; Tadashi Kuwabara, Yokohama; Michihiro Mese, Chigasaki; Tomohiro Esaki, Yokohama, all of Japan

[73] Assignee: Hitachi, Ltd., Tokyo, Japan

[21] Appl. No.: 361,623

[22] Filed: Dec. 22, 1994

[30] Foreign Application Priority Data

Dec. 22, 1993 [JP] Japan ..................... 5-324330
Mar. 2, 1994 [JP] Japan ..................... 6-032137

[51] Int. Cl.⁶ .......................... H04M 1/64; G06F 15/00
[52] U.S. Cl. .................. 379/88; 368/10; 368/29; 368/63; 395/209; 395/2.79; 345/146
[58] Field of Search ..................... 368/10, 28, 29, 368/41, 42, 43; 395/2.79, 2.81, 2.83, 2.84, 963, 209, 334, 350, 351, 358, 329, 331; 379/67, 88, 89, 69; 345/146, 145, 156, 173, 901, 902, 903; 178/18, 19, 20

[56] References Cited

U.S. PATENT DOCUMENTS

| | | | |
|---|---|---|---|
| 4,368,988 | 1/1983 | Tahara et al. | 368/63 |
| 4,391,530 | 7/1983 | Wakabayashi et al. | 368/63 |
| 4,405,241 | 9/1983 | Aihara et al. | 368/93 |
| 4,406,549 | 9/1983 | Takahashi | 368/63 |
| 4,783,800 | 11/1988 | Levine | 379/67 |
| 4,977,520 | 12/1990 | McGaughy, III et al. | 364/521 |
| 5,014,317 | 5/1991 | Kita et al. | 381/43 |
| 5,063,600 | 11/1991 | Norwood | 382/13 |
| 5,093,813 | 3/1992 | Levine | 368/10 |
| 5,113,380 | 5/1992 | Levine | 368/10 |
| 5,138,655 | 8/1992 | Takashima et al. | 379/396 |
| 5,199,009 | 3/1993 | Svast | 368/240 |
| 5,237,651 | 8/1993 | Randall | 395/148 |
| 5,247,438 | 9/1993 | Subas et al. | 364/400 |
| 5,289,531 | 2/1994 | Levine | 379/93 |
| 5,307,086 | 4/1994 | Griffin et al. | 345/146 |
| 5,317,626 | 5/1994 | Jaynes et al. | 379/67 |
| 5,555,536 | 9/1996 | Rolf et al. | 369/16 |
| 5,572,233 | 11/1996 | Kakegawa | 345/116 |

FOREIGN PATENT DOCUMENTS

| | | |
|---|---|---|
| 63-79445 | 4/1988 | Japan . |
| 2-291018 | 11/1990 | Japan . |
| 4-264965 | 9/1992 | Japan . |
| 5-46627 | 2/1993 | Japan . |

OTHER PUBLICATIONS

Patrick Marshall, "CaLANdar Version 2.25". Software review. InfoWorld, v15, No. 34, p. 64 (4), Aug. 1993.

*Primary Examiner*—Krista Zele
*Assistant Examiner*—Daniel S. Hunter
*Attorney, Agent, or Firm*—Kenyon & Kenyon

[57] ABSTRACT

A schedule management system which can display a schedule on a screen and enables the user to enter schedule topics promptly and accurately without performing complicated operation is provided. An external voice is input through a microphone or a network control unit and is converted into a digital signal by an A/D converter and a coder. An identifier related to the digital signal is generated. The identifier is displayed on a schedule on a display unit. The digital signal is stored in a memory in relation to the identifier. A user specifies the displayed identifier through an operation section, whereby the digital signal related to the identifier is extracted from the memory by a CPU, the extracted digital signal is converted into an analog signal by a D/A converter, and the analog signal is output as a voice through a loudspeaker or the network control unit to the outside. Like a voice, an image can also be handled.

12 Claims, 46 Drawing Sheets

SCHEDULE REGISTRATION

| JULY | | | | | | |
|---|---|---|---|---|---|---|
| SUN | MON | TUE | WED | THURS | FRI | SAT |
| 27 | 28 | 29 | 30 | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

- 20
- 21
- 23
- 22
- 78
- 24
- 25 TIME SPECIFICATION
- 79 DATE SPECIFICATION
- 26 MARK SPECIFICATION
- 27
- 28 HANDWRITTEN MEMO
- 29
- 32 APPOINTMENT WITH MARY

SET ALARM | VOICE MEMO | CHECK | END

FIG.12

TELEPHONE/MAIL MANAGEMENT TABLE

| TELEPHONE/MAIL MANAGEMENT ID | NAME | TELEPHONE NO. | MAIL ADDRESS |
|---|---|---|---|
| DM01 | BETTY SMITH | 03-3456-7890 | KMJ0652 |
| DM02 | MARY HEPBURN | 03-3544-9696 | TKJ02480 |
| DM03 | TOM BROWN | 06-888-2525 | YKJ88888 |
| ⋮ | ⋮ | ⋮ | ⋮ |

111

TRANSMISSION ORDER MANAGEMENT TABLE

| TRANSMISSION ORDER MANAGEMENT NO. | TELEPHONE/MAIL MANAGEMENT ID | ARRANGE DATA |
|---|---|---|
| K01 | DM02 | 00 |
| K02 | DM01 | 01 |
| K03 | DM88 | 00 |
| ⋮ | ⋮ | ⋮ |

TRANSMISSION MANAGEMENT TABLE (113)

|     | TRANSMISSION DATE DATA | TRANSMISSION TIME DATA | APPENDED MARK ID | TELEPHONE/MAIL MANAGEMENT ID | TRANSMIT DATA ID | TELEPHONE/MAIL SELECTION |
|-----|------------------------|------------------------|------------------|------------------------------|------------------|--------------------------|
| A13 | 19930707               | 1230                   | TM69             | DM03                         | BD01             | T                        |
| A24 | 19930715               | 0205                   | TM70             | DM01                         | BD02             | M                        |
| A35 | 19930723               | 1545                   | TM71             | DM02                         | BD03             | T                        |

TRANSMIT DATA MANAGEMENT TABLE (114)

| TRANSMIT DATA ID | TRANSMIT DATA |
|------------------|---------------|
| BD01 | "TELL ME WHEN YOU CAN GO TO COMEDY A" |
| BD02 | "WHAT DO YOU WANT FOR AS A SOUVENIR FROM KYOTO?" |
| BD03 | "WHAT MOVIE DO YOU WANT TO SEE?" |

FIG.16

TRANSMISSION/RECEPTION MANAGEMENT TABLE (115)

| | TRANSMISSION DATE DATA | TRANSMISSION TIME DATA | APPENDED MARK ID | TELEPHONE/ MAIL SELECTION | TRANSMIT DATA ID | RECEIVE DATA ID | TELEPHONE/ MAIL SELECTION |
|---|---|---|---|---|---|---|---|
| A13 | 19930707 | 1230 | TM69 | T | BD01 | RD01 | T |
| A24 | 19930715 | 0205 | TM70 | M | BD02 | 0000 | M |
| A35 | 19930723 | 1545 | TM71 | T | BD03 | RD02 | T |

RECEIVE DATA TABLE — 116

| RECEIVE DATA ID | RECEIVE DATA |
|---|---|
| RD01 | "I CAN GO EVERY SATURDAY" |
| RD02 | "I WANT TO SEE DINOSAUR MOVIE" |
| RD03 | |

DATA MANAGEMENT TABLE FOR EACH RECEIVER

|  | RECEIVE DATA | RECEPTION DATE | RECEPTION TIME | RECEIVER ID |
|---|---|---|---|---|
| RR01 | "SHALL WE GO TO COMEDY A ON SEPTEMBER 4?" | 19930808 | 1530 | RA01 |
| RR02 | "WOULD YOU LIKE TO GO TO AMUSEMENT PARK WITH ME?" | 19930810 | 0830 | RA02 |
| RR03 | "CALL ME" | 19930818 | 1715 | RA01 |

118

RECEIVER NAME MANAGEMENT TABLE

| DISPLAY ADDRESS | NAME | RECEIVER ID |
|---|---|---|
| A62 | PETER | RA01 |
| A52 | CHRISTINE | RA02 |
| A63 | JOHN | RA03 |

|  | JULY | | | | | |
|---|---|---|---|---|---|---|
| SUN | MON | TUE | WED | THURS | FRI | SAT |
| 27 | 28 | 29 | 30 | 1 ♡ | 2 ! | 3 |
|  |  |  | 30 |  |  | 31 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

- 20
- 21
- 23
- 22
- 125 REGISTER SCHEDULE
- 126 RETRIEVE SCHEDULE
- 127 TELEPHONE/MAIL MANAGEMENT
- 128 TRANSMISSION DATE AND TIME SPECIFICATION
- 129 RECEPTION OPERATION
- 130 POWER ON/OFF
- 32 APPOINTMENT WITH MARY

FIG.27

SCHEDULE DATA MANAGEMENT TABLE D

| | DATE ID | APPENDED MARK ID | IMAGE DATA ID | ALARM DATA | |
|---|---|---|---|---|---|
| A03 | 19930630 | BL | NUL | 00000000-0000 | — 536 |
| A04 | 19930701 | HT | VD01 | 19930630-1530 | |
| A05 | 19930702 | BKR | VD02 | 19930602-0900 | |
| ⋮ | ⋮ | ⋮ | ⋮ | ⋮ | |
| A46 | 19930731 | TM1 | VD03 | 19930720-1800 | |

DATE DATA MANAGEMENT TABLE

| DATE ID | DATE | ATTRIBUTE, ETC. |
|---|---|---|
| 19930630 | 30 | NATIONAL HOLIDAY |
| 19930701 | 1 | FESTIVAL AVOIDANCE DAY |
| 19930702 | 2 | |

SCHEDULE DATA MANAGEMENT TABLE D

| | DATE ID | APPENDED MARK ID | IMAGE DATA ID | ALARM DATA |
|---|---|---|---|---|
| A03 | 19930630 | BL | NUL | 00000000-0000 |
| A04 | 19930701 | HT | VD01 | 19930630-1530 |
| A05 | 19930702 | BKR | VD02 | 19930602-0900 |
| ⋮ | ⋮ | ⋮ | ⋮ | ⋮ |
| A46 | 19930731 | TM1 | VD03 | 19930720-1800 |

536

HANDWRITTEN DATA MANAGEMENT TABLE

| APPENDED MARK ID | HANDWRITTEN DATA |
|---|---|
| TM1 | "APPOINTMENT WITH MARY" |
| TM2 | "KATE BIRTHDAY" |
| TM3 | "MEET AUDREY" |

SCHEDULE DATA MANAGEMENT TABLE D — 536

| | DATE ID | APPENDED MARK ID | IMAGE DATA ID | ALARM DATA |
|---|---|---|---|---|
| A03 | 19930630 | BL | NUL | 00000000-0000 |
| A04 | 19930701 | HT | VD01 | 19930630-1530 |
| A05 | 19930702 | BKR | VD02 | 19930602-0900 |
| ⋮ | ⋮ | ⋮ | ⋮ | ⋮ |
| A46 | 19930731 | TM1 | VD16 | 19930720-1800 |
| ⋮ | ⋮ | ⋮ | | |

APPENDED MARK MANAGEMENT TABLE — 40

| APPENDED MARK ID | MARK DATA |
|---|---|
| BL | " " (BLANK) |
| HT | " ♡ " |
| BKR | " ❗ " |

FIG.33

| | JULY | | | | | |
|---|---|---|---|---|---|---|
| SUN | MON | TUE | WED | THURS | FRI | SAT |
| 27 | 28 | 29 | 30 | 1 | 2 | 3 |
| | | | 30 | ♡ | ! | 31 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

RETRIEVE  RESERVED  ADD  RESERVED
         RESERVED       RETURN

32 APPOINTMENT WITH MARY
81 DATE SPECIFICATION
73 MONTH SPECIFICATION

FIG.37

FAX/MAIL MANAGEMENT TABLE

511

| FAX/MAIL MANAGEMENT ID | NAME | FAX NO. | MAIL ADDRESS |
|---|---|---|---|
| DM01 | BETTY SMITH | 03-3456-7890 | KMJ0652 |
| DM02 | MARY HEPBURN | 03-3544-9696 | TKJ02480 |
| DM03 | TOM BROWN | 06-888-2525 | YKJ88888 |
| ⋮ | ⋮ | ⋮ | ⋮ |

FIG.38

TRANSMISSION ORDER MANAGEMENT TABLE

512

| TRANSMISSION ORDER MANAGEMENT NO. | FAX/MAIL MANAGEMENT ID | ARRANGE DATA |
|---|---|---|
| K01 | DM02 | 00 |
| K02 | DM01 | 01 |
| K03 | DM88 | 00 |
| ⋮ | ⋮ | ⋮ |

INFORMATION PROCESSING SYSTEM WHICH CAN HANDLE VOICE OR IMAGE DATA

BACKGROUND OF THE INVENTION

1. Field of the Invention

This invention relates to an information processing system which enables the user to manage schedules and/or make voice memos using an electronic computer system.

2. Description of the Related Art

Hitherto, schedule management systems using an electronic computer system have been proposed, an example of which is described in Japanese Patent Laid-Open No. Hei 4-264964. Each of the schedule management systems uses an electronic computer system, whereby duplicated reservations for conferences, etc., in the same time period can be prevented and schedules of different persons can be retrieved and checked immediately.

Disclosed in Japanese Patent Laid-Open No. Sho 63-79445 is an art in which a function of reproducing a recorded message when necessary can be provided to use a telephone recording function for schedule management.

Further described in Japanese Patent Laid-Open No. Hei 2-291018 is an art in which voice information is included in information subjected to schedule management and is transmitted via a telephone line at a necessary point in time.

Further disclosed in Japanese Patent Laid-Open No. Hei 5-46627 is an art related to a memo management system and method for informing the user of stored memo information at an appropriate time.

With the conventional schedule management systems as described in Japanese Patent Laid-Open No. Hei 4-264965, management such as schedule retrieval and check is made very convenient by using an electronic computer system as described above. However, the use of the electronic computer system causes the following problems to arise:

Programs can be written and registered promptly with schedule media such as long-established blackboards, but the electronic computer system generally involves complicated procedures. For example, generally, to lay out a schedule, persons often communicate with each other via a telephone; they must perform complicated operation on an input device, such as a keyboard, of the conventional schedule management system of the electronic computer system during conversation on the telephone line.

According to the art described in Japanese Patent Laid-Open Nos. Sho 63-79445, Hei 2-291018, and Hei 5-46627, display of a schedule on a display screen is not shown.

Further, to lay out a schedule, persons may use information provided through a facsimile. In this case, they must also perform complicated operation such as read of paper output from the facsimile and handling an input device, such as a keyboard, of the conventional schedule management system of the electronic computer system.

This process is also required whey they receive a postcard, letter, etc., providing information on a schedule.

SUMMARY OF THE INVENTION

It is therefore an object of the invention to provide an information processing system having a schedule management function which can display a schedule on a screen of a display unit and improve operability required for the user to enter a schedule.

It is another object of the invention to provide an information processing system having a voice memo function which enables the user to easily make a voice memo.

To these ends, according to one form of the invention, there is provided an information processing system which provides a schedule management function for displaying a schedule on a display unit, the system comprising a display unit for displaying a schedule having regions corresponding to a plurality of dates, means for inputting a voice, means for converting the voice into digital data, means for assigning an identifier to the voice converted into the digital data, means for storing the digital data of the voice in relation to the identifier thereof, means for inputting a date in relation to the digital data of the voice, display control means for displaying a symbol related to the identifier in a region in the schedule corresponding to the date input through the date input means, and voice output means responsive to a user instruction specifying the schedule region in which the symbol is displayed for converting the digital data assigned the identifier related to the symbol into a voice and outputting it.

According to another form of the invention, there is provided an information processing system which provides a schedule management function for displaying a schedule on a display unit, the system comprising a display unit for displaying a schedule having regions corresponding to a plurality of dates, means for inputting an image as digital data, means for assigning an identifier to the digital data, means for storing the digital data in relation to the identifier thereof, means for inputting a date in relation to the digital data, display control means for displaying a symbol related to the identifier in a region in the schedule corresponding to the date input through the date input means, and retrieval means responsive to a user instruction specifying the schedule region in which the symbol is displayed for displaying the digital data assigned the identifier related to the symbol on the display unit as an image.

According to yet another form of the invention, there is provided an information processing system which provides a voice memo function being connected to a communication system for recording a conversation with an associated system via the communication system, the information processing system comprising: an operation section for accepting user operation for at least either of specification and data; a device for inputting a voice in the information processing system; a device for receiving a voice signal from an associated system via the communication system; an A/D converter for converting the voice, if it is an analog signal, into digital data; means for assigning an identifier to each of the digital data of the voice input in said information processing system and digital data of the voice received from the associated system; means for storing the digital data of the voices in relation to the identifiers thereof; means responsive to identifier specification through said operation section by a user for reading the digital data to which the specified identifier is assigned from said storage means; a D/A converter for converting the read digital data into analog data; and a voice output device for converting the analog data into a voice and outputting it.

According to still another form of the invention, there is provided an information processing system which provides a voice memo function being connected to a communication system using mobile communication for recording a conversation with an associated system via the communication system, said information processing system comprising: an operation section for accepting user operation for at least either of specification and data; a device for inputting a voice in said information processing system; an A/D converter for converting the voice into digital data; a reception device for receiving a voice signal from an associated system via the communication system and outputting digital data of the voice received from the associated system; means for assigning an identifier to each of the digital data of the voice input in said information processing system and digital data of the voice received from the associated system; means for storing the digital data of the voices in relation to the identifiers thereof; means responsive to identifier specification through said operation section by a user for reading the digital data to which the specified identifier is assigned from said storage means; a D/A converter for converting the read digital data into analog data; and a voice output device for converting the analog data into a voice and outputting it.

In operation, an external voice is input and an identifier related to the voice is generated and displayed on a schedule on a screen of the display unit.

To lay out a schedule, persons often communicate with each other by telephone. Therefore, the user can input voice information in telephone conversation to the schedule management system made of an electronic computer system in conjunction with the scheduled date and time for later retrieval and check.

Thus, the user can display a schedule on the screen of the display unit for directly making the most of voice information on telephone conversation without performing complicated operation at a conventional input device, so that the user can enter the schedule contents promptly. Since the user directly enters voice information on conversation, the system enables the user to avoid an input error which may occur if he or she handles conventional input devices, enabling the user to enter a schedule accurately.

In the system of the invention, a voice may be input/output directly by the user or may be input/output via a communication system. In the former case, it is input through a microphone and output from a loudspeaker, for example. In the latter, a system using telephone, mobile communication, satellite communication, etc., is assumed, for example. Communication systems may be used regardless of wire or radio. Any signal transmission systems may be used. Further, handsets in any forms may be used.

To obtain schedule topics, the user may use facsimile reception output or paper space of a postcard, letter, etc. Therefore, the information processing system according to the invention can be provided with means for enabling the user to input image data received by facsimile or image information on space of a postcard, letter, etc., to the schedule management system in conjunction with the scheduled date and time for later retrieval and check.

Thus, the user can directly make the most of image data received by facsimile or image information on space of a postcard, letter, etc., without performing complicated operation at a conventional input device, so that the user can enter the schedule contents promptly. Since the user directly enters image data received by facsimile or image information on space of a postcard, letter, etc., the system enables the user to avoid an input error which may occur if he or she handles conventional input devices, enabling the user to enter a schedule accurately.

BRIEF DESCRIPTION OF THE DRAWINGS

In the accompanying drawings:

FIG. 12 is an illustration showing tables added to the system in FIG. 11;

FIG. 15 is an illustration showing tables used for specification of transmission date and time in FIG. 14;

FIG. 16 is an illustration showing tables to automatically receive messages from associated parties;

FIG. 17 is an illustration showing tables enabling management of receive data for each user;

FIG. 18 is an illustration showing a display screen for reception operation using the tables in FIG. 17;

FIG. 20 is an illustration showing a basic menu screen;

FIG. 27 is an illustration showing another table used with the schedule data management table in FIG. 25;

FIG. 28 is an illustration showing another table used with the schedule data management table in FIG. 25;

FIG. 29 is an illustration showing another table used with the schedule data management table in FIG. 25;

FIG. 33 is an illustration showing an operation screen displayed in the check process in FIG. 32;

FIG. 37 is an illustration showing a facsimile/mail management table used in the system in FIG. 36;

FIG. 38 is an illustration showing a transmission order management table used together with the table in FIG. 37;

DETAILED DESCRIPTION OF THE PREFERRED EMBODIMENTS

Referring now to the accompanying drawings, there are shown preferred embodiments of the invention.

Figure 1:
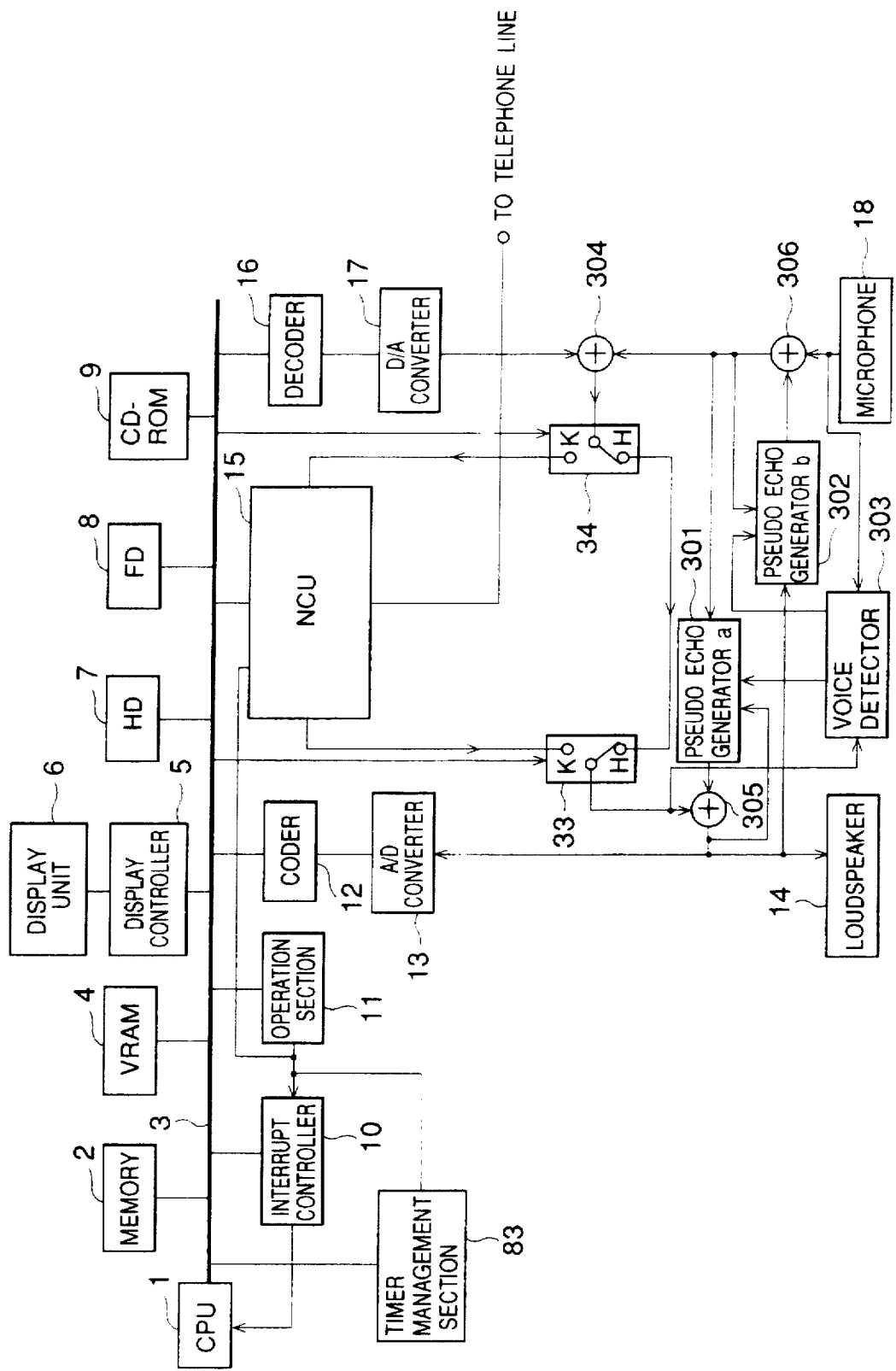
FIG. 1 is a block diagram showing the system configuration according to one embodiment of the invention.

FIG. 1 is a block diagram showing the system configuration according to a first embodiment of the invention. In the figure, numeral 1 is a CPU, numeral 2 is a memory (containing RAM, ROM, and flash memory), numeral 3 is a local bus, numeral 4 is a display memory (VRAM), numeral 6 is a display unit made of, for example, a liquid crystal display, numeral 5 is a drive of the display unit 6, numeral 7 is a hard disk drive and controller (HD), numeral 8 is a floppy disk drive and controller (FD), numeral 9 is a CD-ROM drive and controller (CD-ROM), numeral 10 is an interrupt controller for outputting an interrupt control signal for interrupting the CPU 1, numeral 83 is a timer management section for managing time data and when the user-specified time is reached, for outputting an interrupt control signal to the interrupt controller 10, and numeral 11 is an operation section for getting user entries, etc., through an input device consisting of buttons or a tablet or the like and operating the components in FIG. 1.

Further, as members for providing functions equivalent to a telephone, numeral 15 is a network control unit (NCU), numeral 18 is a microphone, a voice input device, numeral 17 is a D/A converter, numeral 16 is a decoder, numeral 14 is a loudspeaker, a voice output device, numeral 13 is an A/D converter, numeral 12 is a coder, numerals 33 and 34 are change-over switches (SW), numeral 301 is a pseudo echo generator a, numeral 302 is a pseudo echo generator b, numeral 303 is a voice detector, and numerals 304, 305, and 306 are adders. The HD 7, FD 8, and CD-ROM 9 shown in FIG. 1 are provided as data recording and read devices, but not necessarily all the three devices are required; desired ones can be selected among them in the range in which the invention described here can be embodied.

The microphone 18, the loudspeaker 14, and other components can incorporate an amplifier as required. The NCU 15 performs connection processing to a telephone line for providing a communication system. It has the following five functions: The first function is to detect a ringing when called and send a detection signal to the local bus 3 or the interrupt controller 10.

The second function is to switch a hook switch in response to a control signal from the local bus 3; for example, when the user picks up a handset or presses a call button to make a call, the operation section 11 detects it and sends a detection signal via the local bus 3 to the CPU 1, which then causes the NCU 15 to connect the system to a telephone line via the local bus 3 (off hook), or when the user puts down the handset or presses an on-hook button after finishing the call, the operation section 11 detects it and sends a detection signal via the local bus 3 to the CPU 1, which then causes the NCU 15 to disconnect the system from the telephone line via the local bus 3 (on hook).

The third function, which is called "two-wire to four-wire conversion," is to separate two external telephone lines into a total of four transmission and reception lines for suppressing a phenomenon in which the user hears his or her own voice to the transmitter returning to his or her receiver, hereinafter called a sidetone. However, with a receiver designed to cover speaker's ears, the speaker cannot hear his or her voice which should be heard due to space propagation in a normal conversation, and loses a sense of talking, thus a function of suppressing the sidetone to a proper scale is provided.

The fourth function, called "busy tone detection," is to detect a busy tone occurring if the called party is busy when the user calls the party and a silence occurring when the associated party hangs up.

The fifth function, called "DTMF (dual tone multiple frequency) detection," is to detect numbers such as 0, 1, 2, and 3 specified by the associated speaker from a multifrequency code dial tone by a DTMF system (multifrequency code system).

The embodiment shown in FIG. 1 indicates an example in which an information processing system is used as a schedule management system. In the description that follows, the information processing system of the embodiment will be called the schedule management system. The embodiment enables the user to enter voice information in a telephone conversation to set a plan, lay out a schedule, etc., in the schedule management system in association with the scheduled date for later retrieval and check, as described below with reference to FIGS. 2 to 8.

Figure 2:
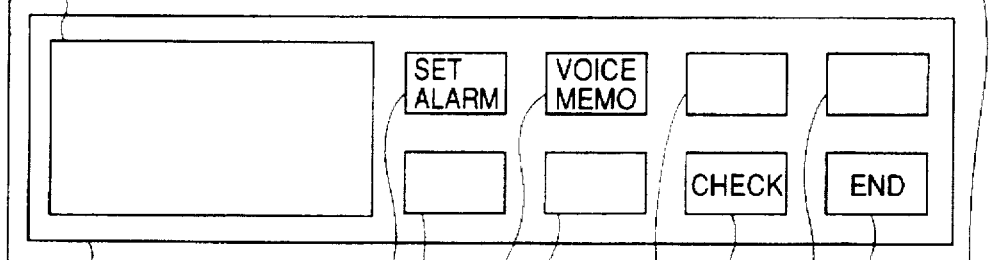
FIG. 2 is an illustration of a calendar displayed on a display screen in the system in FIG. 1.
Figure 3:
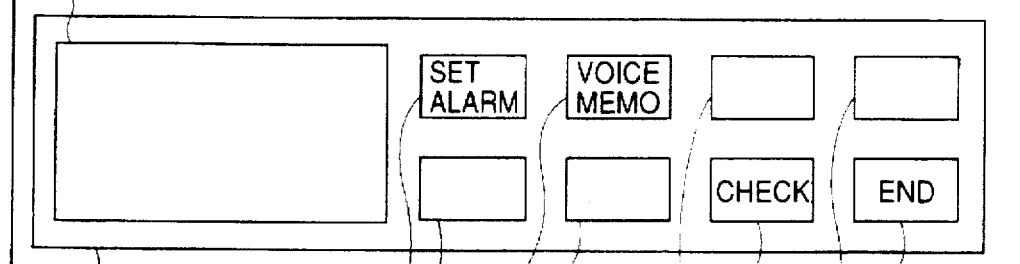
FIG. 3 is an illustration showing the correspondences between date regions of the calendar in FIG. 2 and addresses.
Figure 4:
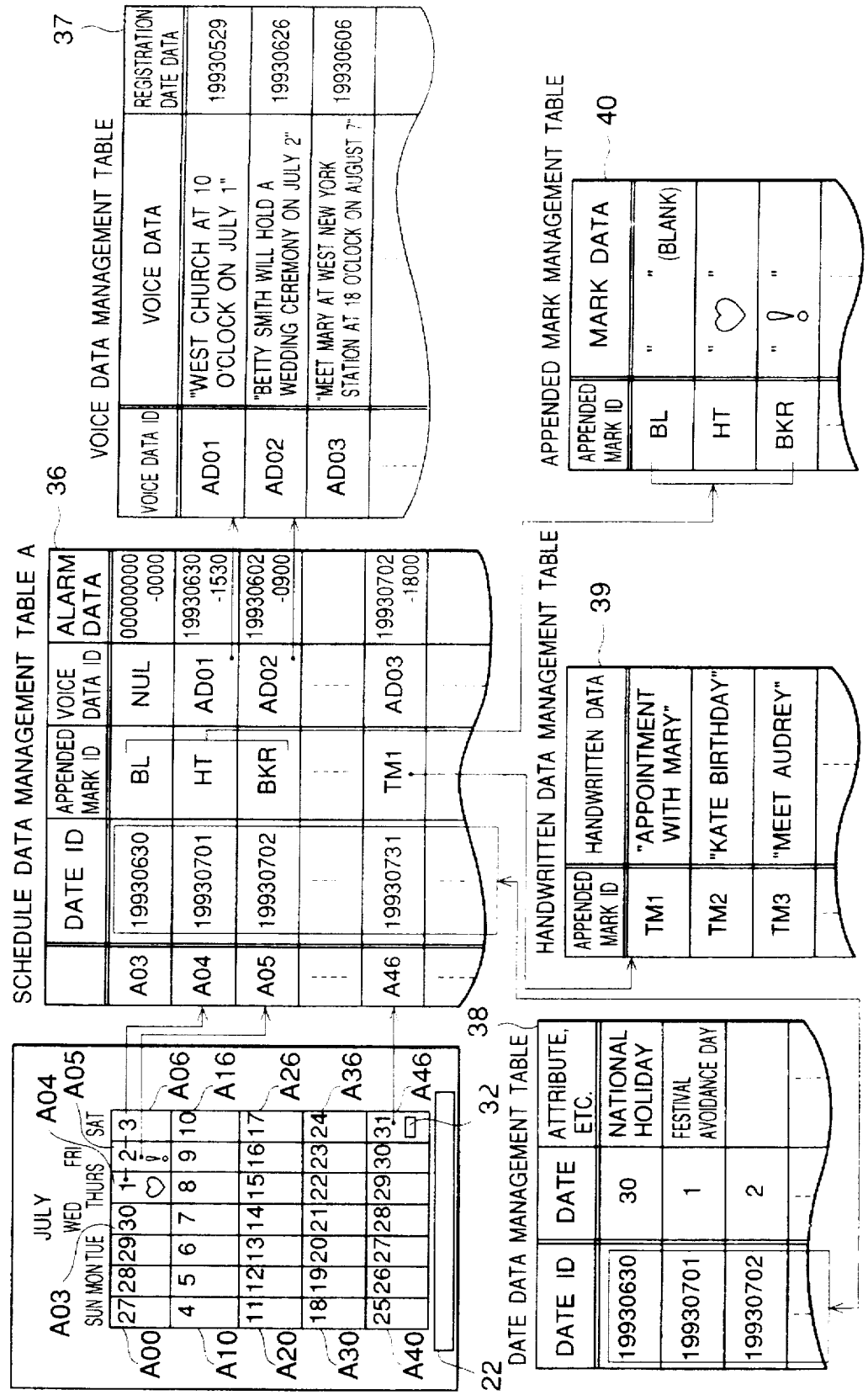
FIG. 4 is an illustration showing data management tables used in the system in FIG. 1.
Figure 5:
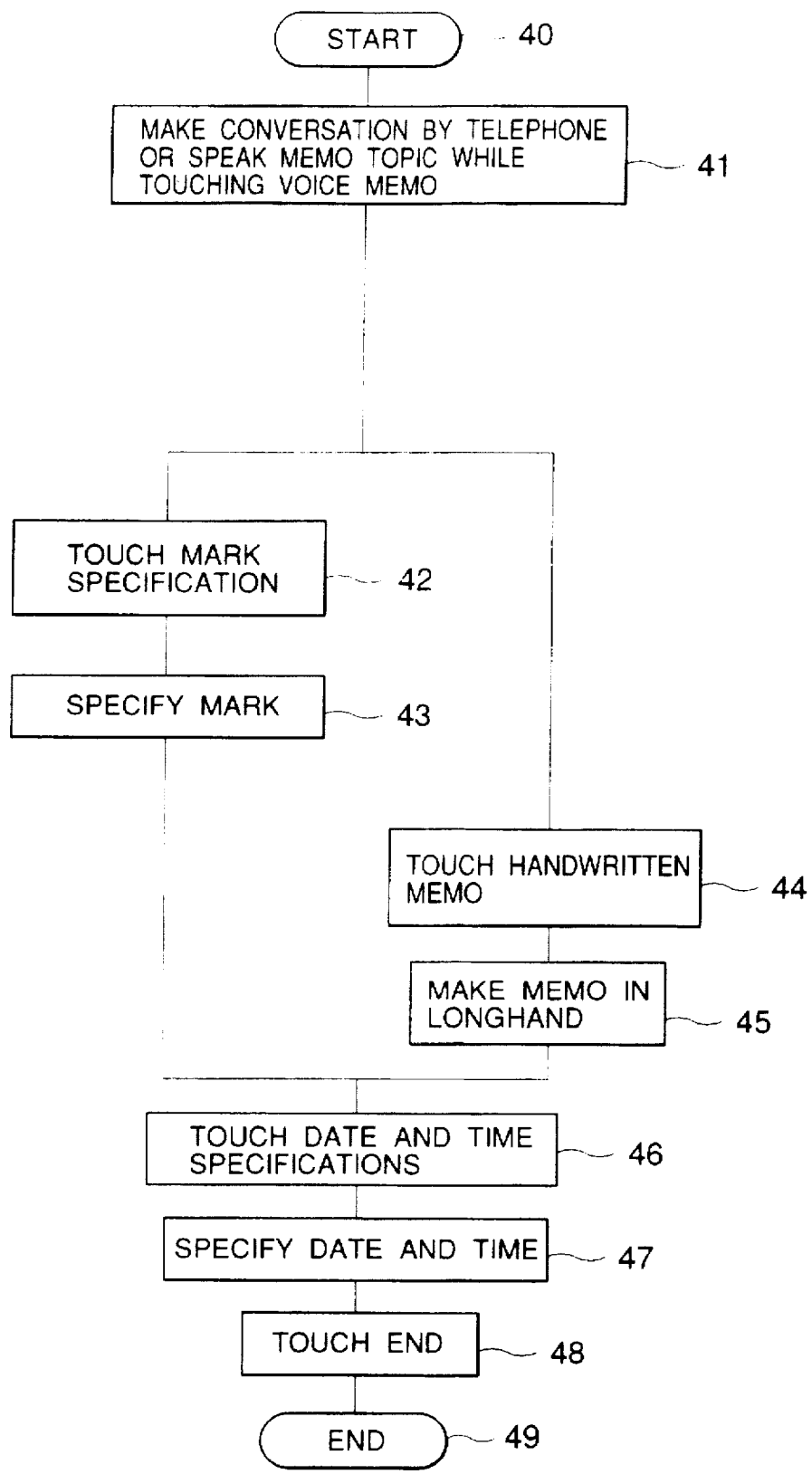
FIG. 5 is a flowchart showing a user operation procedure to register schedule contents in the system in FIG. 1.
Figure 6:
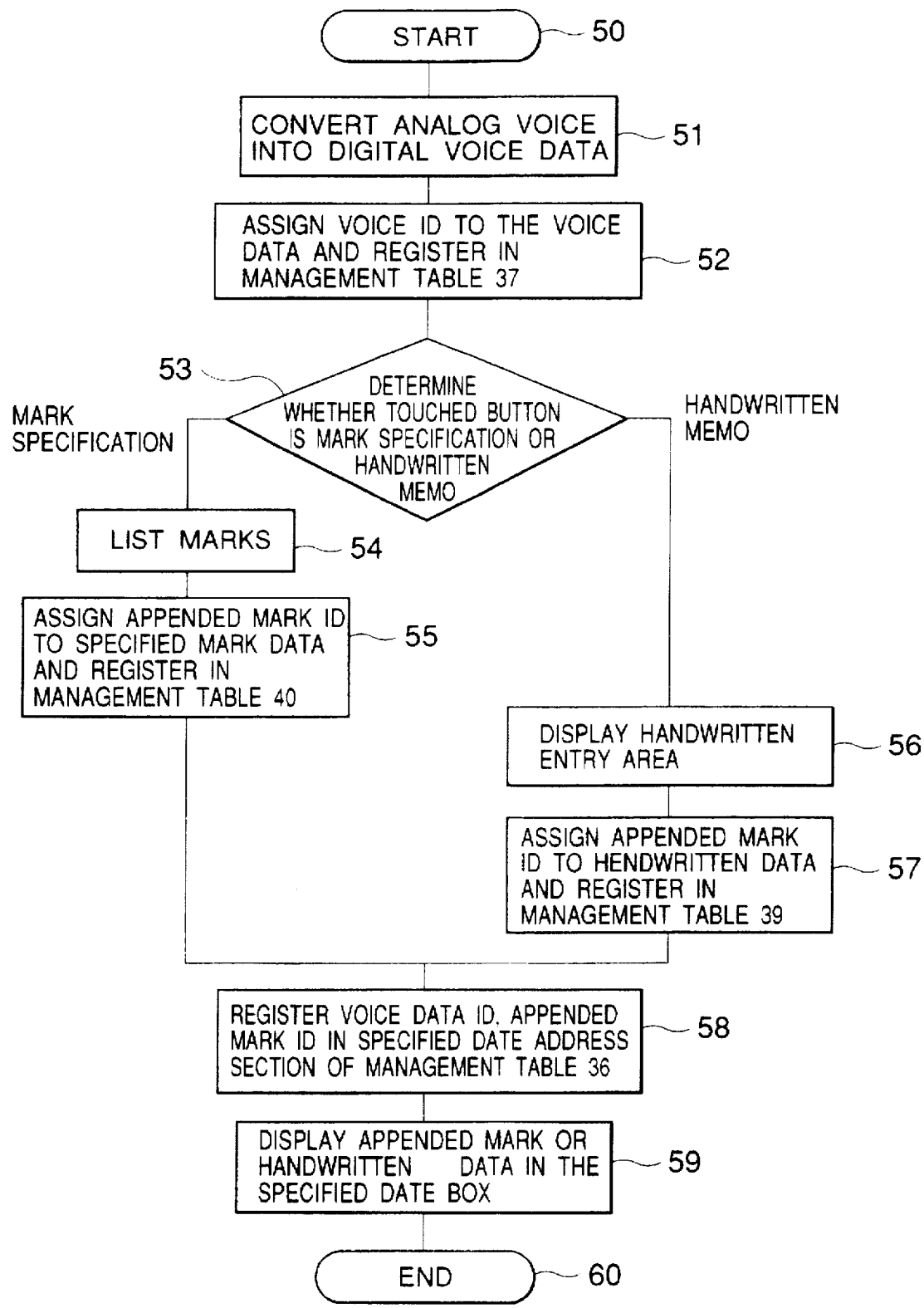
FIG. 6 is a flowchart showing a system processing flow to register the schedule contents according to the operation in FIG. 5.
Figure 7:
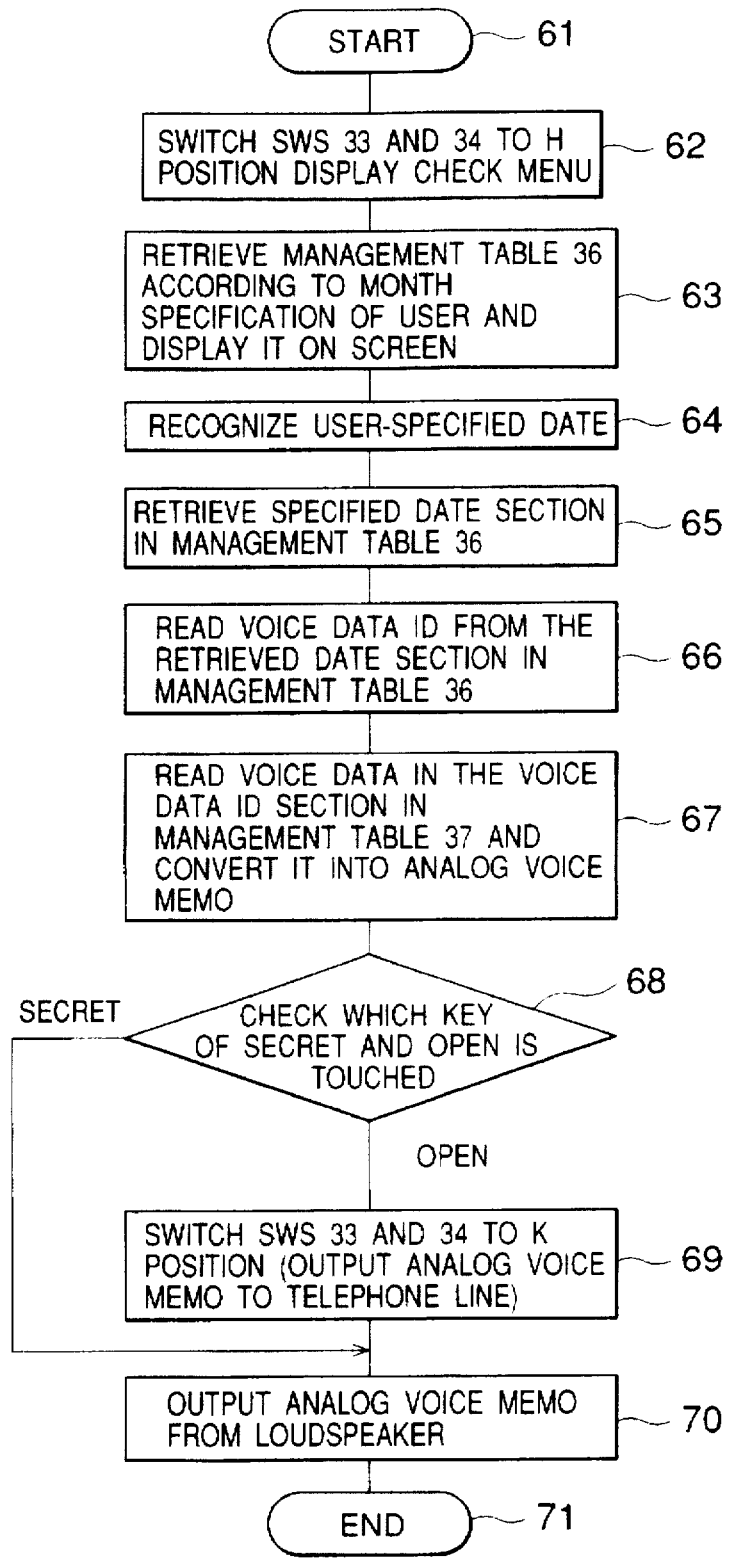
FIG. 7 is a flowchart showing a system processing flow for the user to check the schedule contents registered in the system in FIG. 5.
Figure 8:
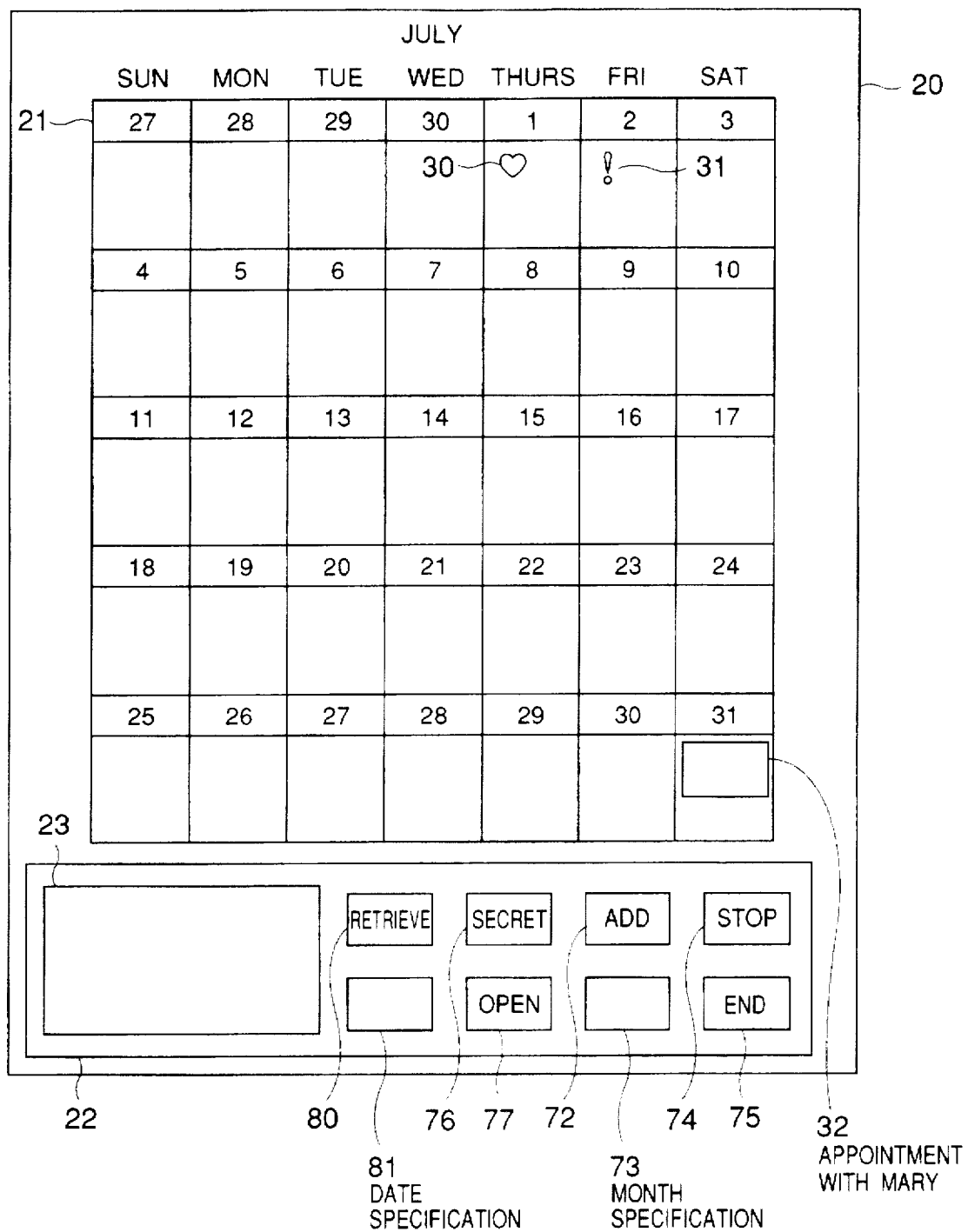
FIG. 8 is an illustration showing a display screen for the user to check (retrieve) the schedule contents in FIG. 7.

FIG. 2 illustrates a monthly calendar screen displayed to use the embodiment as the schedule management system. FIG. 3 relates date boxes to addresses for the display screen in FIG. 2. FIG. 4 is an illustration of tables to register the schedule contents in relation to the dates. FIG. 5 is a flowchart showing a user operation procedure to register the schedule contents. FIG. 6 is a flowchart showing system processing to register the schedule contents. FIG. 7 is a flowchart showing system processing for the user to check the registered schedule contents. FIG. 8 is an illustration showing a screen displayed for the user to check the schedule contents.

Processing for the user to register the telephone conversation contents in the system as a schedule will be described in conjunction with FIGS. 1 to 8. In FIG. 1, SWs 33 and 34 normally are connected to the K position while the user talks by telephone using the loudspeaker 14 and the microphone 18, thus the NCU 15 enables transmission and reception of an aural signal via the telephone line. To register the reception contents from the associated party or the speech contents of the user during the talking as a schedule record, which will be hereinafter referred to as a voice memo, the reception contents or the user speech contents through the microphone 18 are converted into a digital signal by the NCU 15, the SW 33, the A/D converter 13, and the coder 12, and the digital signal is stored in the memory 2 or the HD 7 or the FD 8 via the local bus 3.

The user operation and data processing flow at the time will be discussed in conjunction with FIGS. 2, 4, 5, and 6.

FIG. 2 shows a monthly schedule screen and touch keys provided at the bottom of the screen for managing the schedule screen.

To register a voice memo, first the user touches VOICE MEMO 24, a touch key in FIG. 2, in talking and receives the reception contents from the associated party, or speaks a memo topic at step 41 in FIG. 5. When receiving the operation, the system in FIG. 1 converts analog voice data such as the reception contents into digital voice data at step 51 in FIG. 6, assigns a voice data ID to the voice data, and registers it in a voice data management table 37 in FIG. 4 at step 52 in FIG. 7. For example, in FIG. 4, three messages "WEST CHURCH AT 10 O'CLOCK ON JULY 1," "BETTY SMITH WILL HOLD A WEDDING CEREMONY ON JULY 2," and "MEET MARY AT WEST NEW YORK STATION AT 18 O'CLOCK ON AUGUST 7" are shown.

Next, the user specifies indication of a mark or handwritten memo (symbol) to express registration of the voice memo in the schedule management system on the display screen in FIG. 2. If the user wants mark indication, he or she touches MARK SPECIFICATION 26 at step 42 to specify a mark at step 43. Then, when the operation section 11 in the system detects a touch of MARK SPECIFICATION 26, prepared marks are listed in a display area 23 in the lower-left portion of FIG. 2 at step 54. Next, based on the user specification, an appended mark ID is assigned to the specified mark data and they are related to each other for registration in an appended mark management table 40 in FIG. 4 at step 53. For example, in the figures, "_" (space), "♥" (heart mark), and "!" (exclamation mark) are shown as appended marks.

If the user wants to append handwritten data rather than marks, he or she touches HANDWRITTEN MEMO 28 at step 44 for entering a handwritten memo at step 45. Then, when detecting a touch of HANDWRITTEN MEMO 28, the system displays a handwritten input area in the display area 23 or the date boxes of the calendar at step 56, assigns an appended mark ID to the user-entered handwritten data through the operation section 11, and registers them in a handwritten data management table 39 in FIG. 4 at step 57. In the figure, "APPOINTMENT WITH MARY," "KATE BIRTHDAY," and "MEET AUDREY" are shown as handwritten data examples.

Further, to set the date and time on which the voice memo is registered, the user touches DATE SPECIFICATION 79 and TIME SPECIFICATION 25 at step 46 in FIG. 5 and specifies the date and time at step 47, then touches END 29 at step 48 for completing the registration at step 49. To specify the date and time, the user can not only enter it directly through the keyboard, but also point to the corresponding date box on the display screen.

The system registers the voice data ID, appended mark ID, or handwritten data ID in the user specification date section of the schedule data management table A 36 in FIG. 4 at step 58 in FIG. 6, then displays the appended mark or handwritten data in the specified date box in FIG. 2 at step 59 for indicating to the user that registration has been made, and completes the registration process at step 60.

A specific example of the processing is given below: Consider registering the telephone reception contents of "WEST CHURCH AT 10 O'CLOCK ON JULY 1" from the associated party as illustrated in the voice data management table 37 in FIG. 4 in the schedule management system, for example. First, AD01 of a voice data ID is assigned to the voice data converted into a digital signal for registration in the voice data management table 37. If the user specifies appending of a heart mark to the voice data, HT of an appended mark ID is assigned to the heart mark data for registration in the appended mark management table 40.

To register the voice data in the July 1 box in FIG. 2 as specified by the user, HT of the appended mark ID and AD01 of the voice data ID are registered in the section of the date box address A04 corresponding to July 1 in the schedule data management table 36 in FIG. 4. Upon completion of the registration, a heart mark is appended to the July 1 box on the display screen in FIG. 2.

If the user wants to append a handwritten memo to the voice data, TM1 of an appended mark ID is assigned to handwritten data as shown in FIG. 4, for example, "APPOINTMENT WITH MARY," then they are registered in the handwritten data management table 39. Next, TM1 of the appended mark ID and AD03 of the voice data ID are registered in the section of the date box address A46 corresponding to July 31 in FIG. 2 as specified by the user in the schedule data management table 36. Upon completion of the registration, the handwritten data "APPOINTMENT WITH MARY" 32 is appended to the July 31 box on the display screen in FIG. 2.

Numeral 38 in FIG. 4 is a date data management table which stores dates and attributes, such as movable feasts and national holidays, corresponding monthly to the date boxes A00-A46 in FIG. 3. The date data management table 38 can be looked up in by reading data stored in the ROM, RAM, or flash memory in the memory 2 or the HD 7 or using the FD 8 or CD-ROM 9 for reading data stored on recording media.

If the data management tables 36, 37, 39, and 40 in FIG. 4 described above are stored in the ROM, RAM, or flash memory in the memory 2, for example, the top address of each data entry can be used for the identifier (ID) of the data entry; if the tables are stored as files on the recording media used with the HD 7 or FD 8, file names can be used for the IDs of the files. This also applies to the date data management table 38 in FIG. 4. The data for appended marks can also be stored in the ROM, RAM, or flash memory in the memory 2 or the HD 7 in FIG. 1 or as files on the recording media used with the FD8 or CD-ROM 9, and be read whenever necessary for reference. Thus, the user can also prepare or change his or her desired marks and store them in the above-mentioned store area for later read and use.

As shown in FIG. 3, the addresses are related to the boxes assigned to monthly dates corresponding to a general calendar: A00 to A06 are related to Sunday to Saturday in the first week, A10 to A16 are related to Sunday to Saturday in the second week, A20 to A26 are related to Sunday to Saturday in the third week, A30 to A36 are related to Sunday to Saturday in the fourth week, and A40 to A46 are related to Sunday to Saturday in the fifth week.

When a voice memo is registered, its appended mark or handwritten memo is displayed together with the date in the corresponding box of A00–A46. With a tablet overlaid on the display screen 20, the user sees displayed dates in registration of a voice memo and specifies his or her desired registration date with a finger, pen, or the like. This feature is used when the address of the specified date (A00–A46) is gotten through the operation section 11 and voice data, etc., is registered in the management table 36 in relation with the display screen.

If a number of related addresses in FIG. 3 are provided for one date, as many schedule entries as the number of the addresses provided for a single date can be registered. In FIG. 3, however, one address is related to one date for simplicity. This does not limit the number of registered schedule entries per date of the invention.

Next, processing for the user to check or retrieve the registration contents in the schedule management system will be discussed with reference to FIGS. 1–4, 7, and 8.

FIG. 7 is a flowchart showing a processing flow of the schedule management system for the user to check the registration contents. FIG. 8 is an illustration showing an operation screen displayed when the user touches CHECK 27 check in FIG. 2.

When the user touches CHECK 27 in FIG. 2, the process shown in FIG. 7 is started at step 61, and the operation screen 22 in FIG. 8 is displayed for the user. At the same time, the SWs 33 and 34 are switched to the H position at step 62 for preventing the associated party from hearing voice memos even in communication. After the user touches MONTH SPECIFICATION 73 on the screen in FIG. 8, the system accepts the user-entered month for check and retrieves the management table 36 of the month based on the date ID in FIG. 4. If the current month displayed on the screen 20 in FIG. 8 is not the desired month, the system changes the screen display to that corresponding to the desired month based on the management table 36 at step 63. Seeing the display screen, the user specifies the date box to be checked with a finger, pen, or the like. Then, the system recognizes the address of the specified date box at step 64 through the tablet, operation section 11, and retrieves the specified date section in the management table 36 at step 65 for reading the voice data ID at step 66. Next, the system reads the voice data related to the voice data ID from the management table 37 in FIG. 4 and converts the voice data into the original analog voice memo at step 67 by the decoder 16 and the D/A converter in FIG. 1.

If the user do not want the associated party to hear the voice memo during talking by telephone, he or she touches SECRET 76 in FIG. 8. The system determines whether or not SECRET 76 is touched at step 68. If it is touched, the system switches the SWs 33 and 34 to the H position for outputting the voice memo only from the loudspeaker 14 at step 70, and completes the process at step 71. That is, the voice memo is not output to the telephone line. Since the SWs 33 and 34 are switched to the H position just after CHECK 27 is touched as described above, the secret mode is entered even if the user does not touch SECRET 76. Therefore, the user need not necessarily touch SECRET 76.

If the user wants the associated party to hear the voice memo, he or she touches OPEN 77 in FIG. 8 for the system to restore the SWs 33 and 34 to the K position (normal mode) at step 69, whereby the voice memo is output from the loudspeaker 14 at step 70 and also output via the NCU 15 to the telephone line, enabling the associated party to hear it.

In the system configuration in FIG. 1, two switches SWs 33 and 34 are provided for switching in order to prevent the analog voice signal output from D/A conversion from being input to the NCU 15, but the number of SWs is not limited to two.

The SWs need not necessarily be provided; if means can be provided for preventing D/A conversion output from being input to the NCU 15 when the user does not want the associated party to listen a voice memo, the means may be in any form.

If the user wants to stop the voice memo when hearing it in the above-mentioned process, he or she can touch STOP 74 in FIG. 8. Then, a touch of STOP 74 is detected by the operation section 11 in FIG. 1 and the CPU 1 is interrupted by the interrupt controller 10 for stopping output of the voice memo.

If there is a telephone call for the user during the voice memo check process, the NCU 15 detects the ring and interrupts the CPU 1 by the interrupt controller 10 for informing the user of the call on the display screen.

Further, to add a voice memo topic to an already registered voice memo, the user can touch ADD 72 in FIG. 8. To end the voice memo check process and return to the normal mode shown in FIG. 2, the user can touch END 75. Of course, these steps can also be started by the interrupt controller 10 while the user hears the voice memo.

Next, a function for informing the user of a registered schedule will be described in conjunction with SET ALARM 78 in FIG. 2.

For example, to inform the user of the schedule "WEST CHURCH AT 10 O'CLOCK ON JULY 1" at 1530 hours on Jun. 30, 1993, the user touches SET ALARM 78 after registering the voice memo. Next, the user touches DATE SPECIFICATION 79 and enters 19930630 (Jun. 30, 1993), then touches TIME SPECIFICATION 25 and enters 1530 (1530 hours), whereby the data "19930630–1530" is set in the alarm data column in the schedule data management table A 36.

On the other hand, the timer management section 83 in FIG. 1 periodically references the alarm data column in the schedule data management table A 36 in FIG. 4. If the current time of day matches the setup time, the timer management section 83 informs the user by producing a warning beep or blinking the corresponding symbol on the display screen in FIG. 2.

If the user does not require an alarm and not set it, automatically "00000000–0000" is set in the alarm data column in the schedule data management table A 36, inhibiting the timer management section 83 from performing the alarm information process if the setup time is reached.

Figure 10:
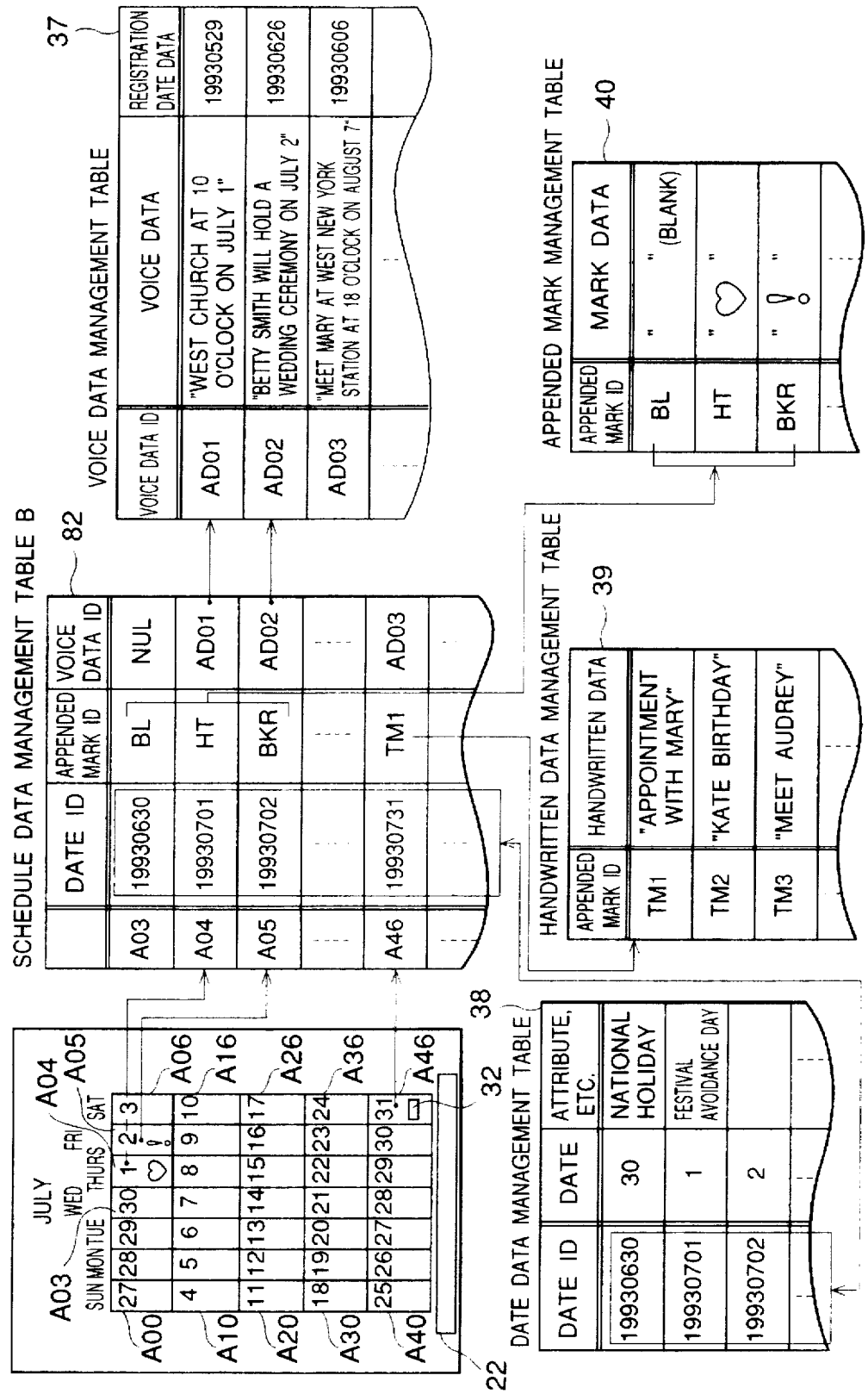
FIG. 10 is an illustration of modified forms of the tables in FIG. 4.

For a system not requiring any alarm setting, SET ALARM 78 is not necessary in FIG. 2 and a schedule data management table B 82 containing no alarm data column shown in FIG. 10 is used.

Although the user can use the touch keys provided on the screen in FIG. 2 for entry operation, operation buttons are not limited to the touch keys and the user can also use a tablet to select entries displayed on the screen with a pen or finger. Therefore, the display contents on the display screen 20 can also be selected for operation.

By the way, the telephone in the embodiment in FIG. 1 is not a general telephone for the user to apply the receiver to his or her ear for conversation; it is a telephone, called a hands-free telephone, for the user to make conversation using the loudspeaker and microphone built in the system.

The functions of the pseudo echo generator a 301 and pseudo echo generator b 302 used with the hands-free telephone in FIG. 1 will be described.

Since a voice input through the microphone 18 is output from the loudspeaker 14 by reflection from the NCU 15, a so-called echo occurs. To prevent the echo from occurring, the pseudo echo generator a 301 generates a pseudo echo based on the input through the microphone 18 so as to cancel the echo component from the NCU 15. The pseudo echo is input to the adder 305 for canceling the echo component from the NCU 15. A detection signal from adder 305 output is fed back into the pseudo echo generator a 301 and the pseudo echo generator a 301 is controlled so as to exclude the echo component from the detection signal.

Further, in the hands-free telephone, the voice output from the loudspeaker 14 may be again input to the microphone 18 because of acoustic coupling, causing an oscillation phenomenon, referred to as howling noise, to occur. To prevent the howling noise from occurring, the pseudo echo generator b 302 generates a pseudo echo based on the input from the loudspeaker 14 so that the microphone 18 can cancel the input signal component of the loudspeaker 14. The pseudo echo is input to the adder 305 for canceling the signal component from the loudspeaker 14 to the microphone 18. A detection signal from adder 306 output is fed back into the pseudo echo generator b 302 and the pseudo echo generator b 302 is controlled so as to exclude the echo component from the detection signal.

The voice detector 303 detects the presence of a reception signal meaning that the associated party is speaking in telephone conversation or the presence of a transmission signal meaning that the user is speaking by comparing the scales of the signal components. When the voice detector 303 detects the presence of a reception signal, the pseudo echo generator b 302 is controlled based on the detection signal fed back from the adder 306 output only in the detection period. Likewise, when the voice detector 303 detects the presence of a transmission signal, the pseudo echo generator a 301 is controlled based on the detection signal fed back from the adder 305 output only in the detection period.

Figure 9:
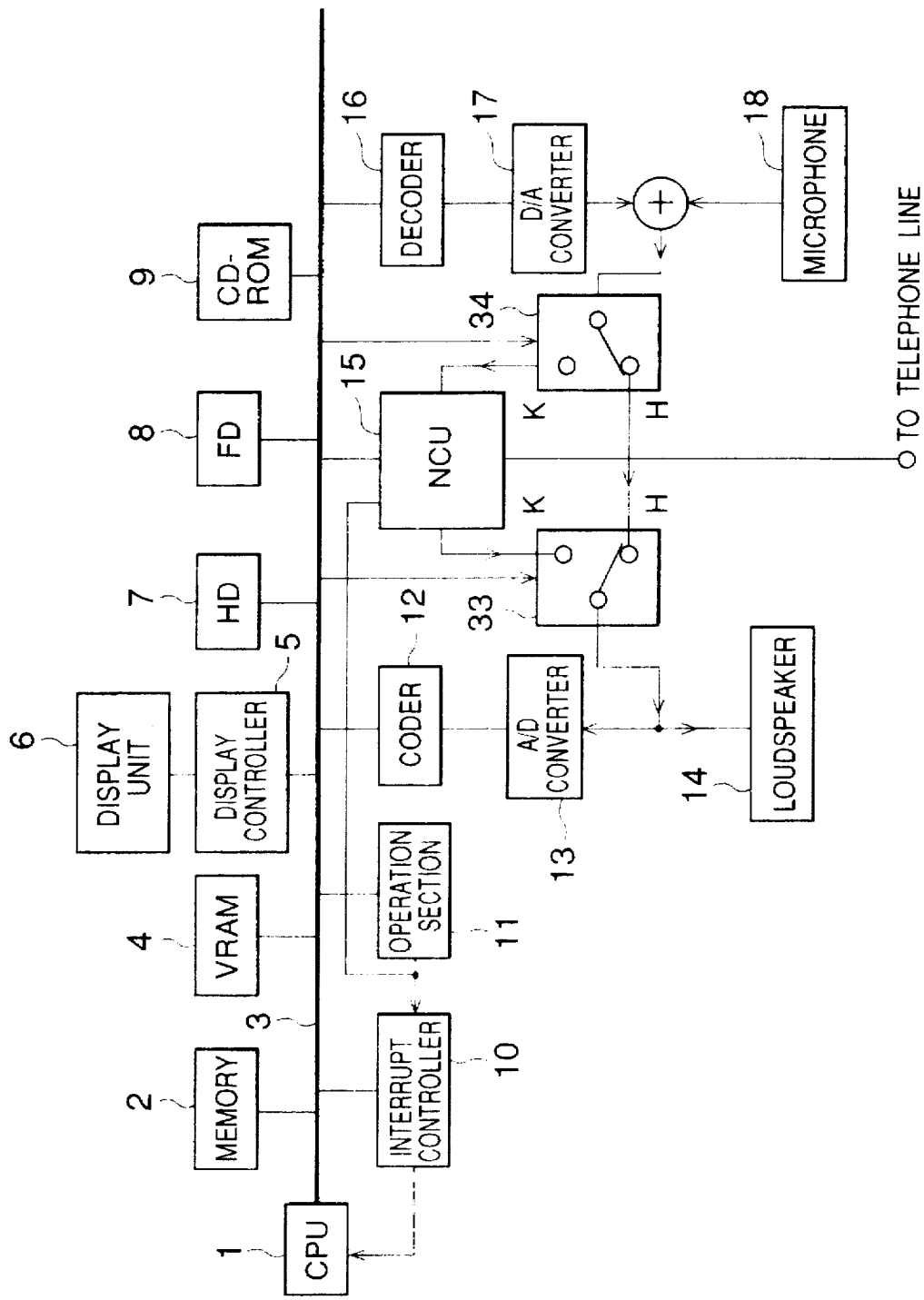
FIG. 9 is a block diagram showing the system configuration according to a modified embodiment provided by excluding the echo cancel section from the system in FIG. 1.

Next, FIG. 9 shows a modified embodiment for a telephone using a general handset rather than the hands-free telephone. The modified embodiment is the same as the first embodiment in FIG. 1 except that it need not necessarily have the pseudo echo generator a 301 or b 302 for preventing an echo or howling noise because it does not handle the hands-free telephone.

Next, a modified embodiment for connecting the system of the invention to a local area network (LAN) for registering a schedule, etc., not only by telephone, but also by electronic mail using a voice will be discussed with reference to FIGS. 11 to 15.

Figure 11:
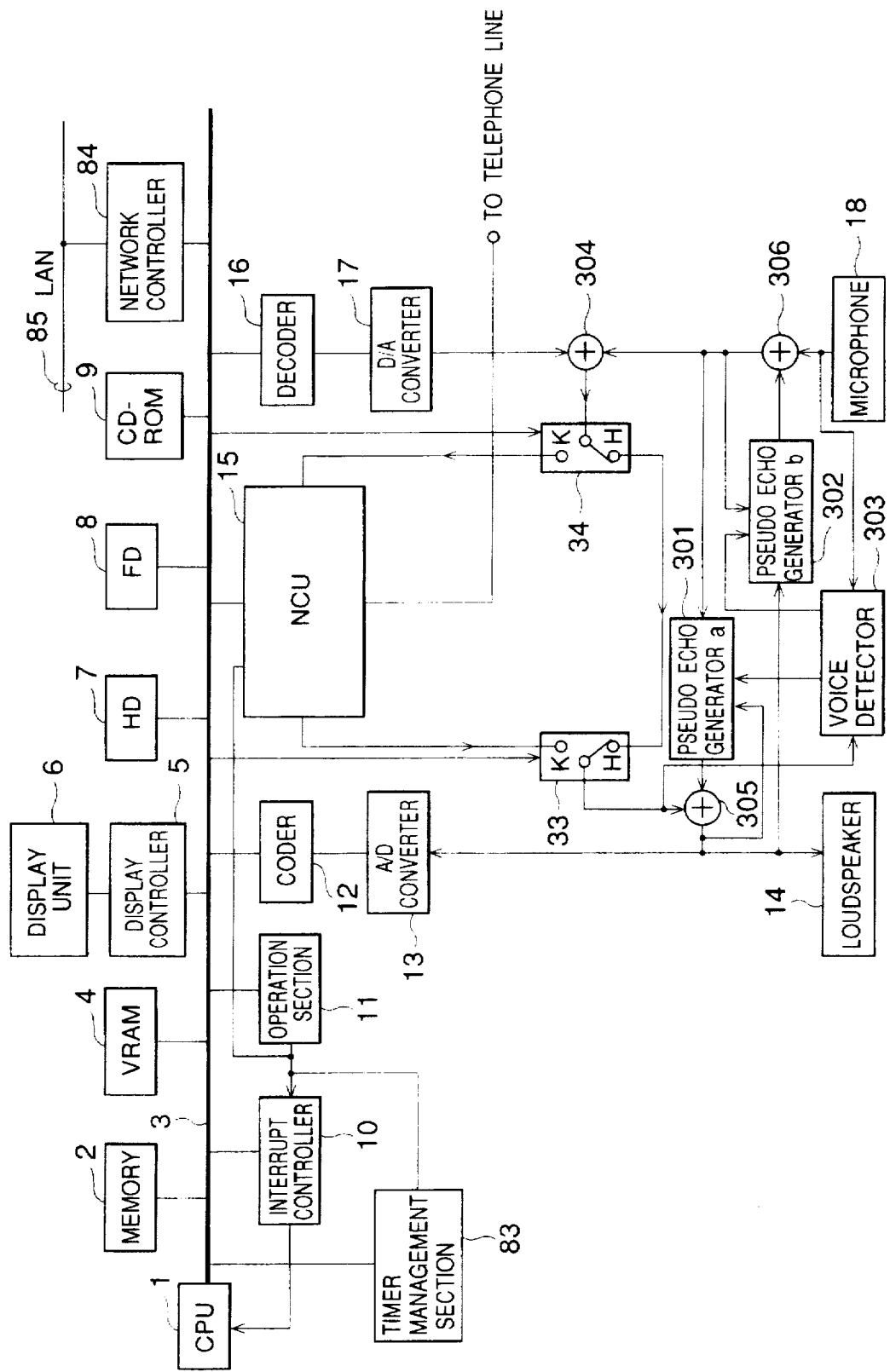
FIG. 11 is a block diagram showing the system configuration according to a modified embodiment provided by adding a network controller to the system in FIG. 1.

The system configuration of the modified embodiment in FIG. 11 is the same as that of the first embodiment in FIG. 1 except that it contains a network controller 84 for connecting the embodiment in FIG. 1 to a LAN 85.

Figure 13:
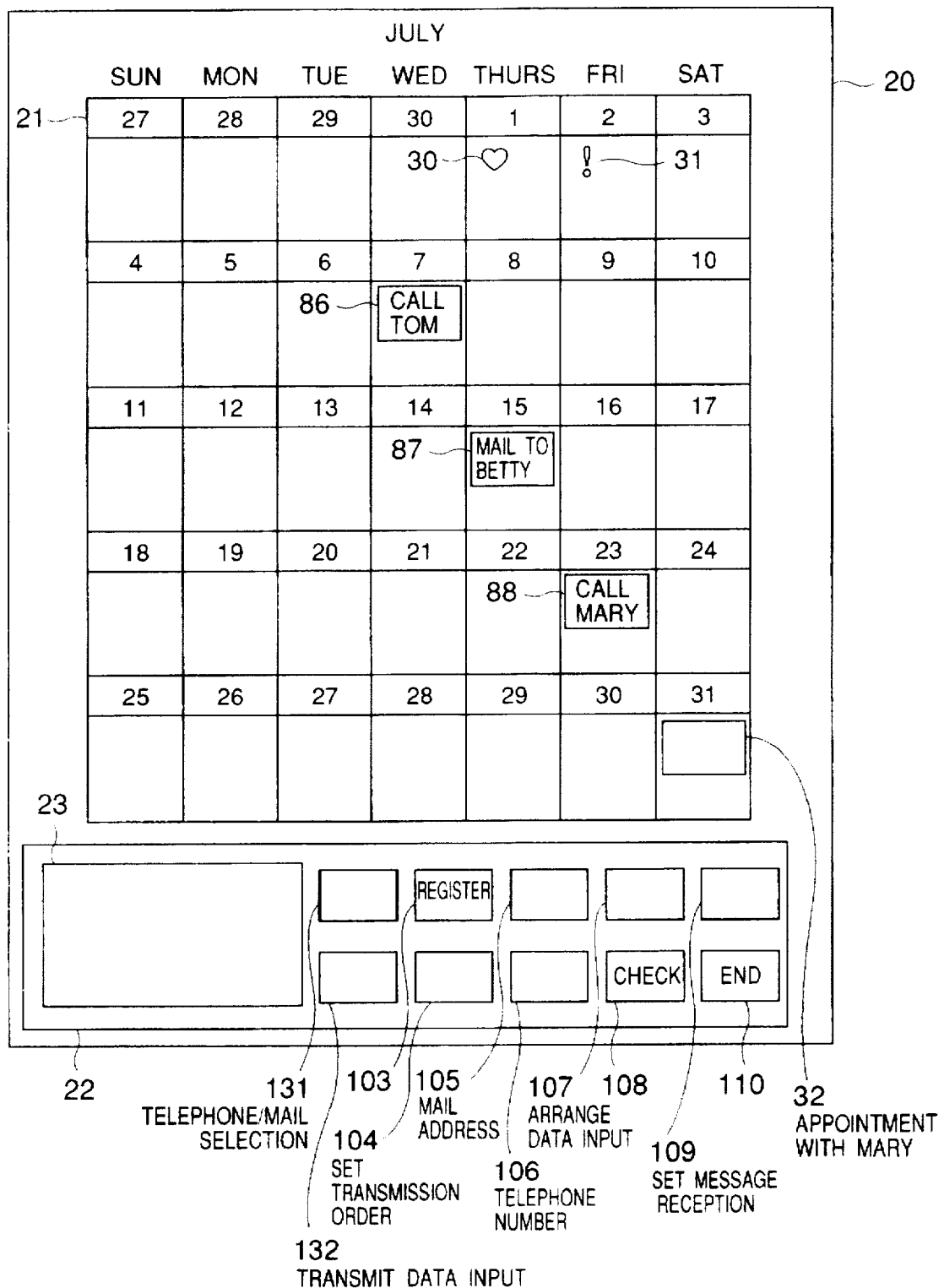
FIG. 13 is an illustration showing a display screen for telephone/mail management using the tables in FIG. 12.

FIG. 12 shows a telephone number and electronic mail destination address management table 111 and a transmission order management table 112 for calling persons (parties) listed in the telephone/mail management table 111 or transmitting electronic mail to them in order. The tables are added to the system in FIG. 11. FIG. 13 is an illustration of a telephone/mail management display screen for registration in and use of the telephone/mail management table 111 and the transmission order management table 112. To select the screen, a TELEPHONE/MAIL MANAGEMENT touch key 127 is provided on a basic menu screen in FIG. 20.

First, to register a telephone number in the telephone/mail management table 111, the user touches TELEPHONE NUMBER 106 on the screen in FIG. 13, then touches REGISTER 103 and enters a name and telephone number by finger or pen operation.

To register a mail address in the telephone/mail management table 111, likewise, the user touches MAIL ADDRESS 105 on the screen in FIG. 13, then touches REGISTER 103 and enters a name and mail address by finger or pen operation. Here, the telephone/mail management table 111 can be stored in the memory 2 or the HD 7 in FIG. 11 or on a floppy disk through the FD8.

To make a call or transmit electronic mail, the user touches TELEPHONE NUMBER 106 or MAIL ADDRESS 105 on the screen in FIG. 13 to display the telephone/mail management table 111 in a display area 23 in FIG. 13. At the time, the telephone/mail management table 111 is read from the memory 2, HD 7, or FD 8 for reference and display. Next, the user points to the telephone number or mail address of the desired party in the display area 23 with a finger or a pen, whereby automatically the data (telephone number or mail address) is looked up in the telephone/mail management table 111 and connection is made to the desired party via the NCU 15 if it is a call or via the network controller 84 if electronic mail, enabling the user to talk with or transmit electronic mail to the associated party.

The telephone/mail management table 111 can also be read from CD-ROM where telephone numbers and mail addresses are stored through the CD-ROM 9.

The display area of the telephone/mail management table 111 is not limited to the display area 23 and the table 111 can be displayed in any desired area on the display screen 20. To make a call or transmit electronic mail, the user needs only to point to the telephone number of mail address of the associated party with a finger or a pen in response to the display; the user need not enter the full number or address at each time.

When the user calls the desired party, if the party is absent, the user touches TRANSMIT DATA INPUT 132 and enters transmit data such as voice data, then touches TELEPHONE/MAIL SWITCH 131. The system looks up the mail address in the telephone/mail management table 111 from the telephone number, then automatically transmits electronic mail to the desired party.

The following method is also possible as an alternative method for carrying out the process: When the user calls the desired party, if the party is absent, the user touches TELEPHONE/MAIL SWITCH 131. Then, the system requests the user to enter transmit data such as voice mail. When the user responds to the request with transmit data such as voice data, the system looks up the mail address in the telephone/mail management table 111 from the telephone number, then automatically transmits electronic mail to the desired party.

Further, to eliminate the need for the user to touch TELEPHONE/MAIL SWITCH 131 for starting the process, the system can also request the user to execute all steps in order and perform processing as the user responds to the requests. In this case, TELEPHONE/MAIL SWITCH 131 is made unnecessary, needless to say.

By the way, the user might want to call or transmit electronic mail to a number of parties in order. In this case, the user can previously register the desired parties in the transmission order management table 112 in FIG. 12 for simplifying the telephone or electronic mail transmission sequence. To do this, first the user touches SET TRANSMISSION ORDER 104 in FIG. 13, then TELEPHONE NUMBER 106 or MAIL ADDRESS 105 for displaying the telephone/mail management table 111 in the display area 23, then sets the transmission order by finger or pen operation in the transmission order management table 112.

Thus, after the transmission order management table 112 is displayed in the display area 23 at transmission, the user can start transmission by finger or pen operation for transmitting in order of transmission order management numbers K01, K02, . . . However, the user can touch ARRANGE DATA INPUT 107 in FIG. 13 and change data under the arrange data column in the transmission order management table 112 from "00" to "01" to skip some persons (parties) listed in the transmission order management table 112 in the transmission sequence. Relating the arrange data "01" to persons to be skipped and "00" to those to be called is an example; any other data values may be used if whether or not transmission is required can be specified.

Figure 14:
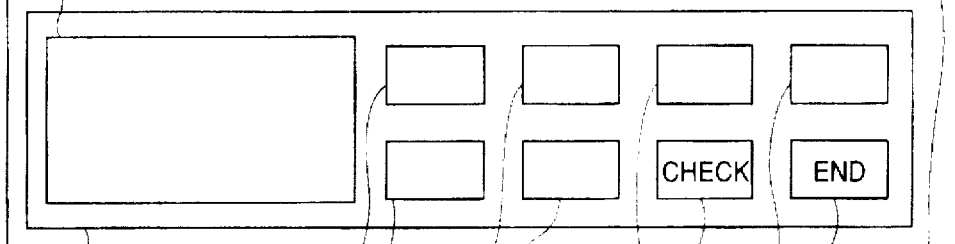
FIG. 14 is an illustration showing a display screen for specification of automatic transmission date and time.

Next, an example for specifying a date and time for automatic calling or electronic mail transmission with voice data will be discussed. In FIG. 15, numeral 114 is a transmit data management table for registering transmit data and numeral 113 is a transmission management table for specifying a date and time for executing electronic mail transmission of transmit data registered in the transmit data management table 114. FIG. 14 shows a display screen for transmission date and time specification using the tables 113 and 114. To call the screen, a TRANSMISSION DATE AND TIME SPECIFICATION touch key 128 is provided on the basic menu screen in FIG. 20.

First, in FIG. 14, the user touches TRANSMIT DATA INPUT 97 and enters voice data, etc., for registering transmit data in the transmit data management table 114. Next, the user touches PARTY SPECIFICATION 95 in FIG. 14 for displaying the telephone/mail management table 111 in the display area 23, then points to the registered name of the associated party, whereby the telephone/mail management ID of the associated party in the telephone/mail management table 111 is registered in the telephone/mail management ID column in the transmission management table 113. Further, the user touches DATE SPECIFICATION 96 and TIME SPECIFICATION 98 in FIG. 14 and enters the date and time at which transmission is to be executed, whereby the date data and time data are registered in the transmission date data and transmission time data columns in the transmission management table 113. To indicate to the user that the transmission registration has been made, when the user touches MARK SPECIFICATION 99 in FIG. 14 and enters an appended mark or handwritten memo, the corresponding appended mark ID in the appended mark management table 40 (FIG. 4) for appended mark or handwritten memo display is registered in the appended mark ID column in the transmission management table 113, whereby the mark or handwritten memo is displayed in the transmission date box on the schedule, for example, in date box 87 in FIG. 14.

If the transmit data is voice data, it can also be transmitted by telephone. To do this, the user touches SELECT TELEPHONE/MAIL 101 in FIG. 14 and sets "T" in the telephone/mail selection column in the transmission management table 113 corresponding to the person to whom the telephone transmission is to be executed, whereby it is determined to be telephone transmission and the telephone transmission will be executed at the specified time on the specified day. Relating "T" to persons to whom telephone transmission is to be executed and "M" to persons to whom electronic mail transmission is to be executed is an example; any other data values may be used if telephone or electronic mail transmission can be identified.

Now, a registering method of transmitting by telephone will be explained concretely, for example in the case there is the appended mark (handwritten memo) on the display screen, such as "CALL TOM" 86 in FIG. 14.

First, in FIG. 14, the user touches TRANSMIT DATA INPUT 97 and enters voice data, "TELL ME WHEN YOU CAN GO TO COMEDY A?", for registering it in transmit data column in item BD01 transmit data ID in the transmit data management table 114. Next, the user touches PARTY SPECIFICATION 95 in FIG. 14 for displaying the telephone/mail management table 111 in the display area 23, then points to the name "TOM BROWN" as the associated party, whereby, in A13 line of the transmit management table 113, item BD01 of the transmit data ID is registered in the transmit data ID column, for referring the corresponding transmit data in transmit data management table 114. At the same time, in the telephone/mail management ID column, item DM03 of telephone/mail management ID is registered, which corresponds to the data "TOM BROWN" in telephone/mail management table 111. Further, the user touches DATE SPECIFICATION 96 in FIG. 14 and enters the desired date for transmission, Jul. 7, 1993, whereby the date data "19930707" is registered in transmission date data column of transmit management table 113. Then, the use touches TIME SPECIFICATION 98 in FIG. 14 and enters the desired time "12:30", whereby the time data "1230" is registered in the transmission time data column in the transmission management table 113. Further, to specify telephone transmission, the user can execute the telephone transmission by touching the "SELECT TELEPHONE/MAIL" 101 in FIG. 14, for setting data "T" in the telephone/mail selection column in the transmission management table 113. To indicate to the user that the transmission registration has been made, when the user touches MARK SPECIFICATION 99 in FIG. 14 and enters the handwritten memo "CALL TOM", the appended mark ID "TM69" in the handwritten data management table 39 (FIG. 28) for the handwritten memo display, is registered in the appended mark ID column in the transmission management table 113, whereby the handwritten memo "CALL TOM" 86 is displayed in the transmission date box on the schedule.

Additional tables in FIG. 16 would enable the user to automatically call a specific party and receive and store a message from the associated party even when the user is absent.

Since the transmission date and time are already registered for "CALL TOM" 86 in FIG. 14, even if the user is absent, automatically the system calls the associated party "TOM BROWN" at the specified time to send message "TELL ME WHEN YOU CAN GO TO COMEDY A." When the associated party "TOM BROWN" returns a response message to the user telephone, the system can register the response message in the receive data table 116 in FIG. 16 as receive data. In FIG. 16, message "I CAN GO EVERY SATURDAY" is registered in RD01 of receive data ID as an example. To register it in the RD01, when registering "CALL TOM" 86, the user should touch SET MESSAGE RECEPTION 109 in FIG. 13 and preset the RD01 in the receive data ID column in the transmission/reception management table 115 in FIG. 16. Thus, the feature enables a message from the associated party to be received and stored for the user to later obtain the message even if he or she is absent at the calling.

Figure 18:
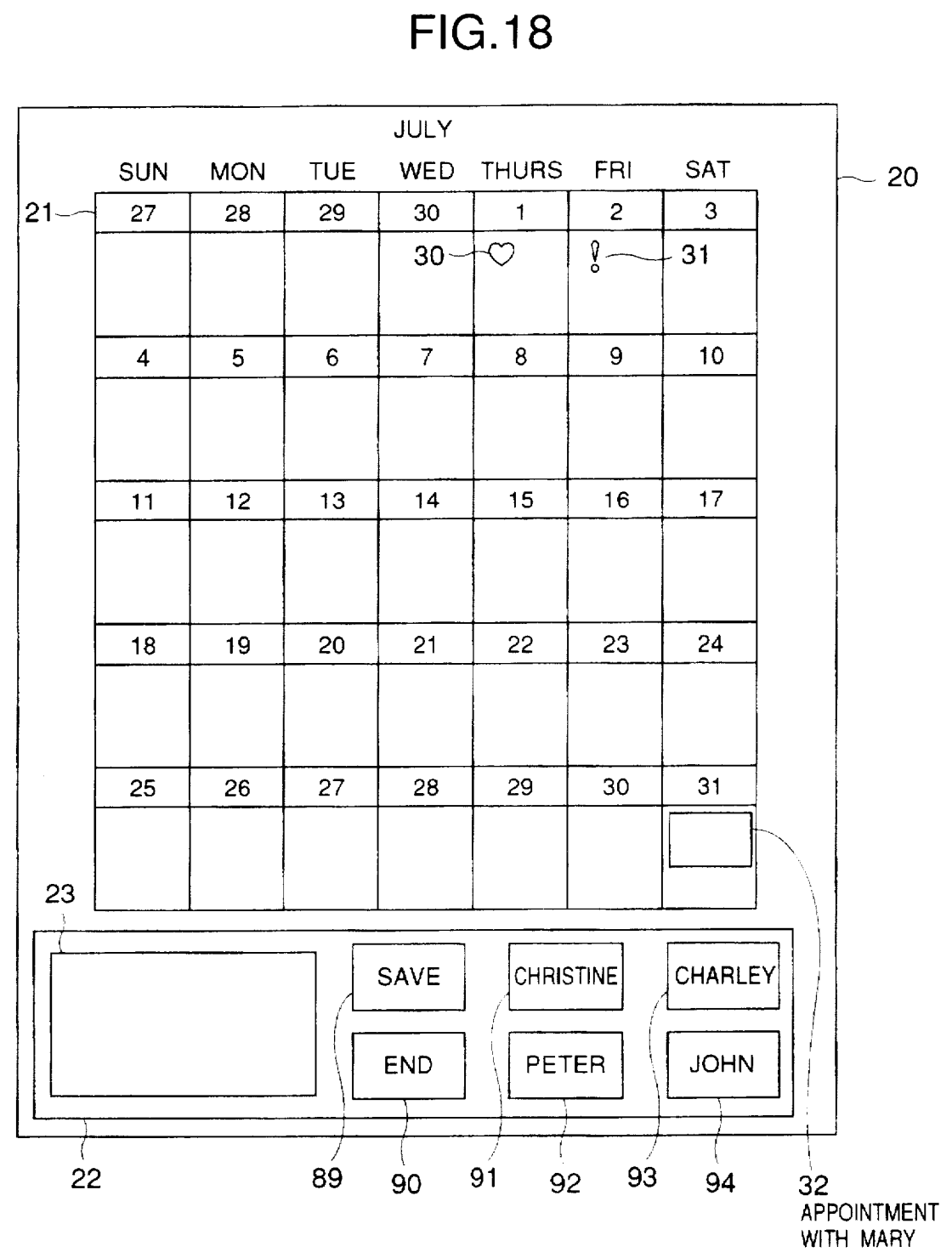

Further, additional tables in FIG. 17 would enable registration of messages sent to a number of users as receive data for each user. In FIG. 17, numeral 117 is a receive data management table for each receiver and numeral 118 is a receiver name management table. FIG. 18 shows a display screen for reception operation related to the tables. The screen may be opened manually by the user who touches RECEPTION OPERATION 129 in FIG. 20 or may be opened by the system automatically when data is received.

First, if a third party receives a call to PETER when he is absent, the third party touches SAVE 89 in FIG. 18 to save and register the receive data in the receive data management table for each receiver 117, then touches PETER 92 for registering RA01 of the receiver ID corresponding to PETER in the receiver name management table 118 in the receiver ID column in the receive data management table for each receiver 117 in FIG. 17. At the time, timer data in the timer management section 83 is referenced and the reception date data and time data are also registered in the reception date and reception time columns in the receive data management table for each receiver 117.

Thus, later Peter needs only to point to PETER 92 in FIG. 18 with a finger or a pen; RA01 is referenced from display address A62 in the receiver name management table 118, then RA01 in the receive data management table for each receiver 117 is retrieved, enabling PETER to obtain the message destined for him.

Since the save and registration date and time are also already registered in the receive data management table for each receiver 117, when the message receiver later obtains the message, he or she can also easily retrieve it based on the save and registration date and time if necessary.

Figure 19:
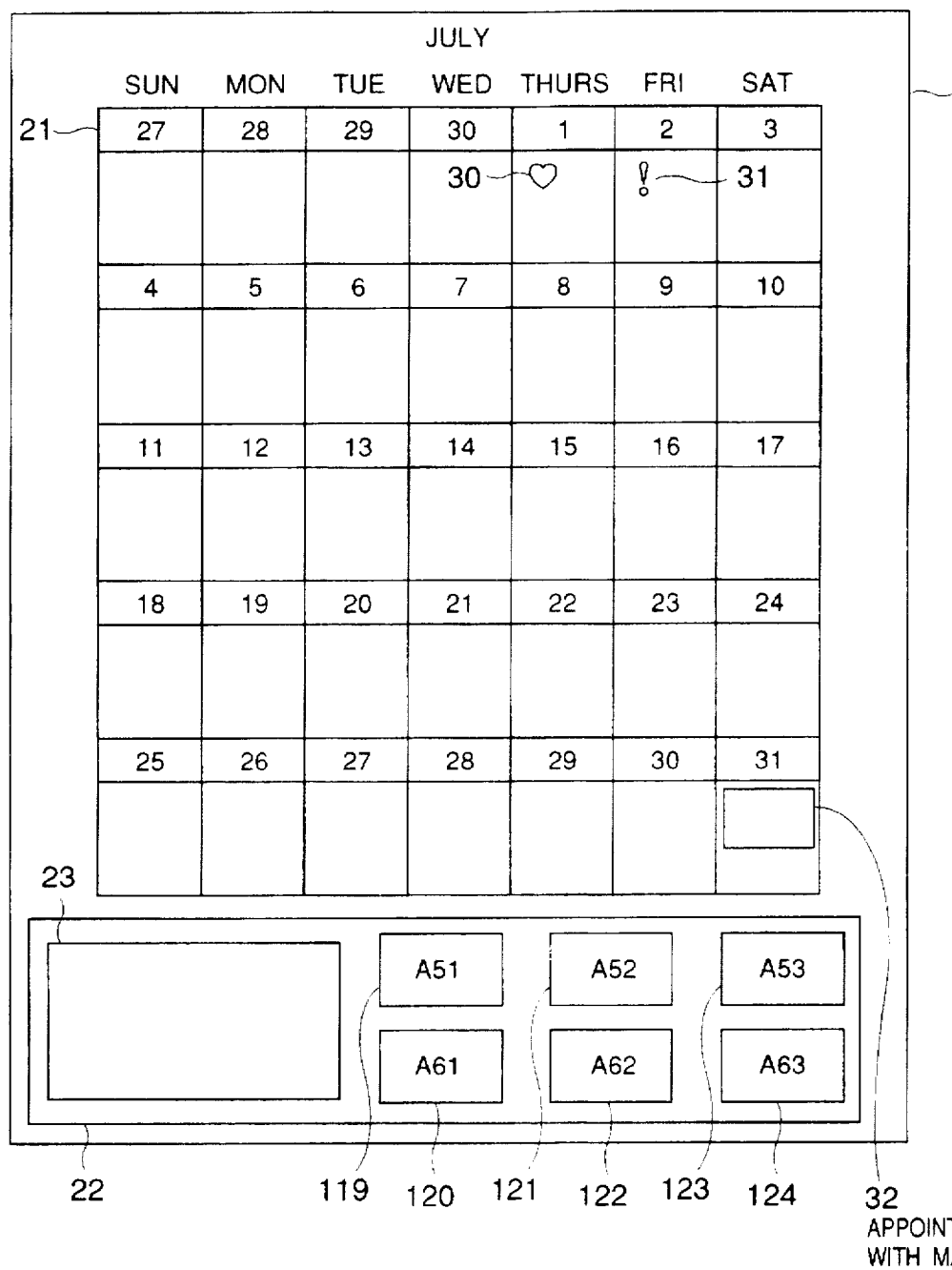
FIG. 19 is an illustration showing the relationship between regions on the display screen in FIG. 18 and addresses.

To save and register receive data for each user, the names and receiver IDs must be previously registered in the receiver name management table 118 in relation with display addresses as shown in FIG. 19. The names in FIG. 18 are displayed by referencing the receiver name management table 118.

The feature enables a third party easily to save and register receive data for each user when they are absent.

In the invention, each operation mode can be selected from the basic menu screen in FIG. 20.

When the user touches REGISTER SCHEDULE 125 in FIG. 20, the display screen in FIG. 2 appears and the transition to the registration process of a voice memo, etc., is made. When the user touches RETRIEVE SCHEDULE 126 in FIG. 20, the display screen in FIG. 8 appears and the transition is made to the retrieval process of a schedule on which voice memos, etc., are registered. When the user touches TELEPHONE/MAIL MANAGEMENT 127, the display screen in FIG. 13 appears and the transition is made to the process of telephone number/electronic mail address registration, etc. When the user touches TRANSMISSION DATE SPECIFICATION 128, the display screen in FIG. 14 appears and the transition is made to the process of automatic transmission of telephone/electronic mail, etc. When the user touches RECEPTION OPERATION 129, the display screen in FIG. 18 appears and the transition is made to the process of saving and registering a message by a third party in place of an absent user and later obtaining the message by the message receiver.

However, the display screen in FIG. 20 and the process transition are shown as an example; the display screen and the process transition are not limited to those described above.

Since the NCU 15 of the invention can detect numbers such as 0, 1, 2, and 3 specified by the associated party from a multifrequency code dial tone by DTMF detection, the schedule management data of the invention can also be checked via a telephone line from a remote point. To do this, process start and operation are previously assigned to the numbers such as 0, 1, 2, and 3 so that the schedule management data check process can be operated, whereby the user at a remote point can transmit the numbers such as 0, 1, 2, and 3 by a multifrequency code dial tone via a telephone line for operating the system and checking the data.

Figure 21:
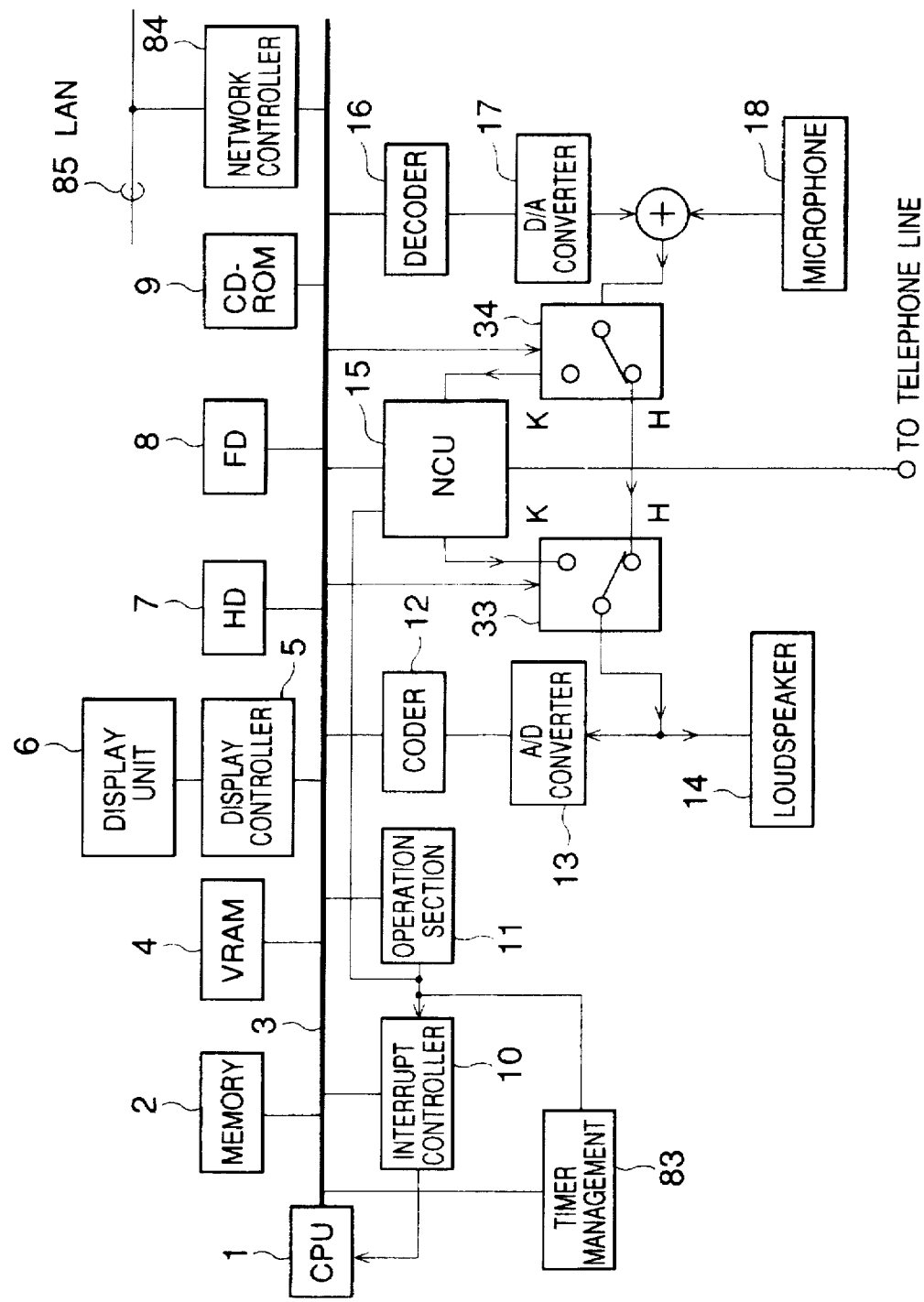
FIG. 21 is a block diagram showing the system configuration according to a modified embodiment using a general telephone.

Next, FIG. 21 shows a modified embodiment for a telephone using a general handset rather than the hands-free telephone. The modified embodiment is the same as that in FIG. 11 except that it need not necessarily have the pseudo echo generator a 301 or b 302 for preventing an echo or howling noise because it does not handle the hands-free telephone.

The embodiment and modified embodiments in FIGS. 1, 9, 11, and 21 can provide a voice memo system as well as the schedule management system. That is, the voice memo function of the system can be used as a phone-answering and recording machine and automatically a selection signal can be generated for automatic dialing by specifying telephone number data stored in the memory 2. Voice, image, and text data stored in the CD-ROM 9, FD 8, and HD 7 can also be referenced on the display screen. The voice memo system can be constructed separately from the schedule management system.

Figure 42:
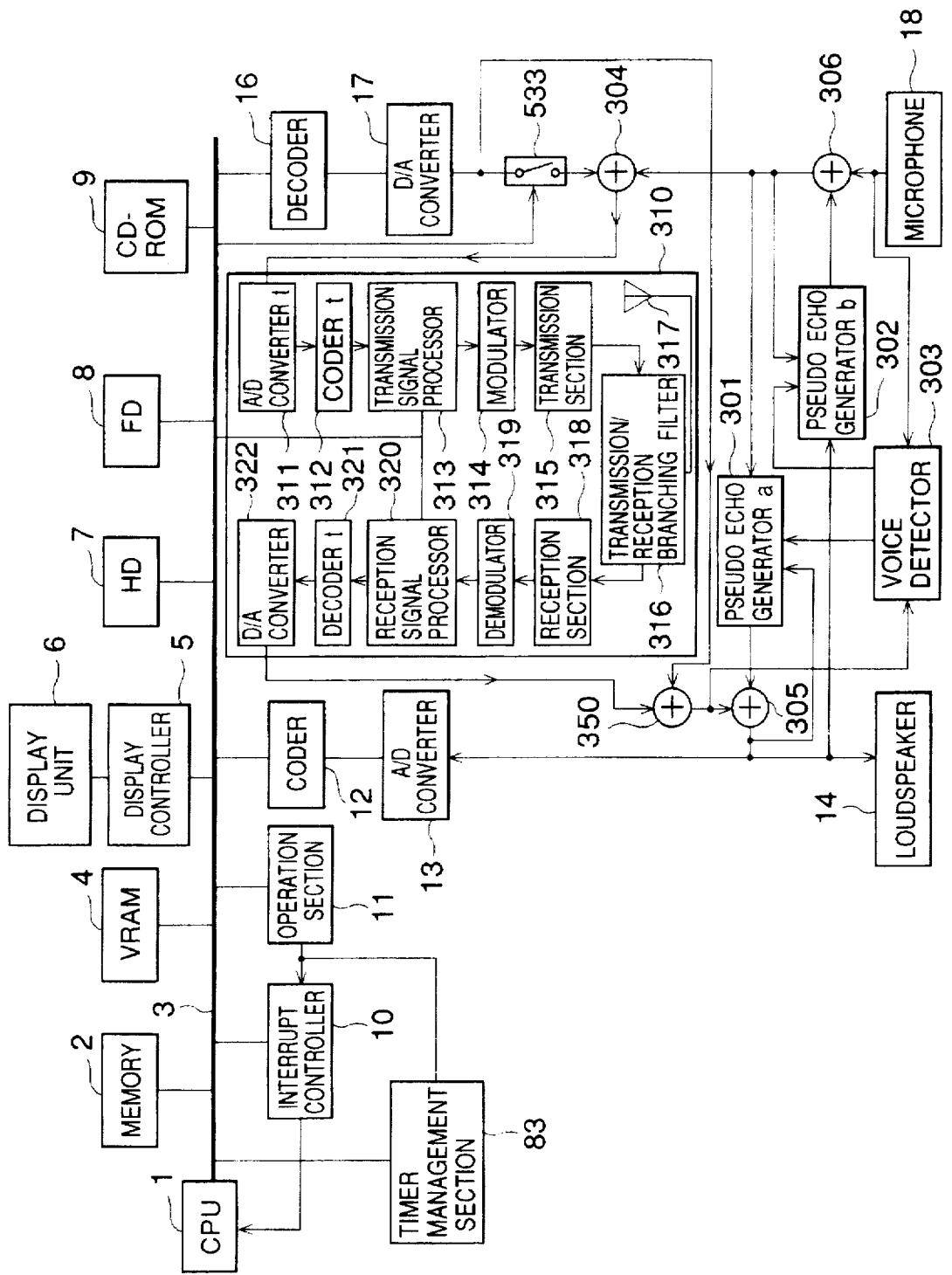
FIG. 42 is a block diagram showing the system configuration according to another embodiment of the invention.

Next, an embodiment using a portable telephone of mobile communication, etc., as a telephone will be discussed. FIG. 42 is a block diagram of the embodiment using a portable telephone 310 in place of the NCU 15 in FIG. 1.

In the portable telephone 310, numeral 311 is an A/D converter t, numeral 312 is a coder t, numeral 313 is a transmission signal processor, numeral 314 is a modulator, numeral 315 is a transmission section, numeral 316 is a transmission/reception branching filter, numeral 317 is an antenna, numeral 318 is a reception section, numeral 319 is a demodulator, numeral 320 is a reception signal processor, numeral 321 is a decoder t, and numeral 322 is a D/A converter. The A/D converter t 311, coder t 312, transmission signal processor 313, modulator 314, transmission section 315, transmission/reception branching filter 316, and the antenna 317 make up a transmitter. The antenna 317, transmission/reception branching filter 316, reception section 318, demodulator 319, reception signal processor 320, decoder 321 t, and D/A converter 322 make up a receiver.

The transmission signal processor 313 and the reception signal processor 320, which are connected to a CPU 1 by a bus, transfer data to and from peripheral devices such as a memory 2 and operate under the control of the CPU 1.

The operation of the portable telephone 310 will be described.

A transmission voice is converted into a digital signal through a microphone 18 and the A/D converter t 311 and the digital signal is compressed by the coder t 312. Next, the compressed signal is sent to the transmission signal processor 313, which then adds an error correction code, etc., to the signal. Then, the signal is converted into the digital signal transmission format and sent to the modulator 314. However, addition of the error correction code is not necessarily required depending on the signal processing method. The modulator 314 executes π/4 shift QPSK modulation, for example. After the signal is modulated, it is sent via the transmission section 315 and the transmission/reception branching filter 316 to the antenna 317 from which the signal is transmitted to space as a transmission wave.

On the other hand, a reception wave is received by the antenna 317 and sent via the transmission/reception branching filter 316 and the reception section 318 to the demodulator 319, which then detects it and converts into a base band signal, then demodulates the signal to recover the original digital signal. After this, the reception signal processor 320 extracts data from the receive data format and performs error correction processing for the data. However, the error correction processing is not necessarily required depending on the signal processing method. Next, the signal is expanded by the decoder t 321 and converted into an analog signal by the D/A converter t 322, then the signal is reproduced as a voice signal from a loudspeaker 14.

The processing is performed under the control of the CPU 1. The program and data required for the control are stored in the memory 2 and a work area used to temporarily store data and for control processing is provided in the memory 2. Desired operation for the portable telephone 310 can also be entered through an operation section 11 and necessary information, messages, etc., are provided on a display unit 6.

Voice memo registration process is the same as that in the system in FIG. 1 and therefore will not be discussed again.

Here, voice memo check process will be described.

To check a voice memo, the user touches CHECK 27 in FIG. 2, then the system retrieves the voice memo to be checked as specified by the user, and outputs it. At the time, the already registered reception voice data is expanded by a decoder 16 and converted into an analog voice by a D/A converter 17 and the analog voice is passed through adders 350 and 305 and output from the loudspeaker 14.

When the voice memo is checked, the reception voice data actually received by the antenna 317 and processed, then output from the D/A converter 322 is added to the output from the D/A converter 322 by the adder 350. Therefore, the voice memo specified by the user to check it and the reception voice of the associated party received at the time can be output from the loudspeaker 14 at the same time.

When the voice memo is checked, the system turns off an SW 533 at the same time as the user touches CHECK 27 in FIG. 2, whereby the analog voice memo data output from the D/A converter 17 is not input to an adder 304, thus not input to the A/D converter t 311 of the portable telephone 310, preventing the associated party from hearing the voice memo at the telephone conversation.

However, if the user wants the associated party to hear the voice memo, he or she touches OPEN 77 in FIG. 8 for restoring the SW 533 to the ON position, whereby the voice memo is output from the loudspeaker 14 via the adders 350 and 305 and is also input to the adder 304 and processed by the A/D converter t 311 to the antenna 317. Thus, the voice memo is also output from the antenna 317, enabling the associated party to hear it together with the transmission voice of the user.

Figure 43:
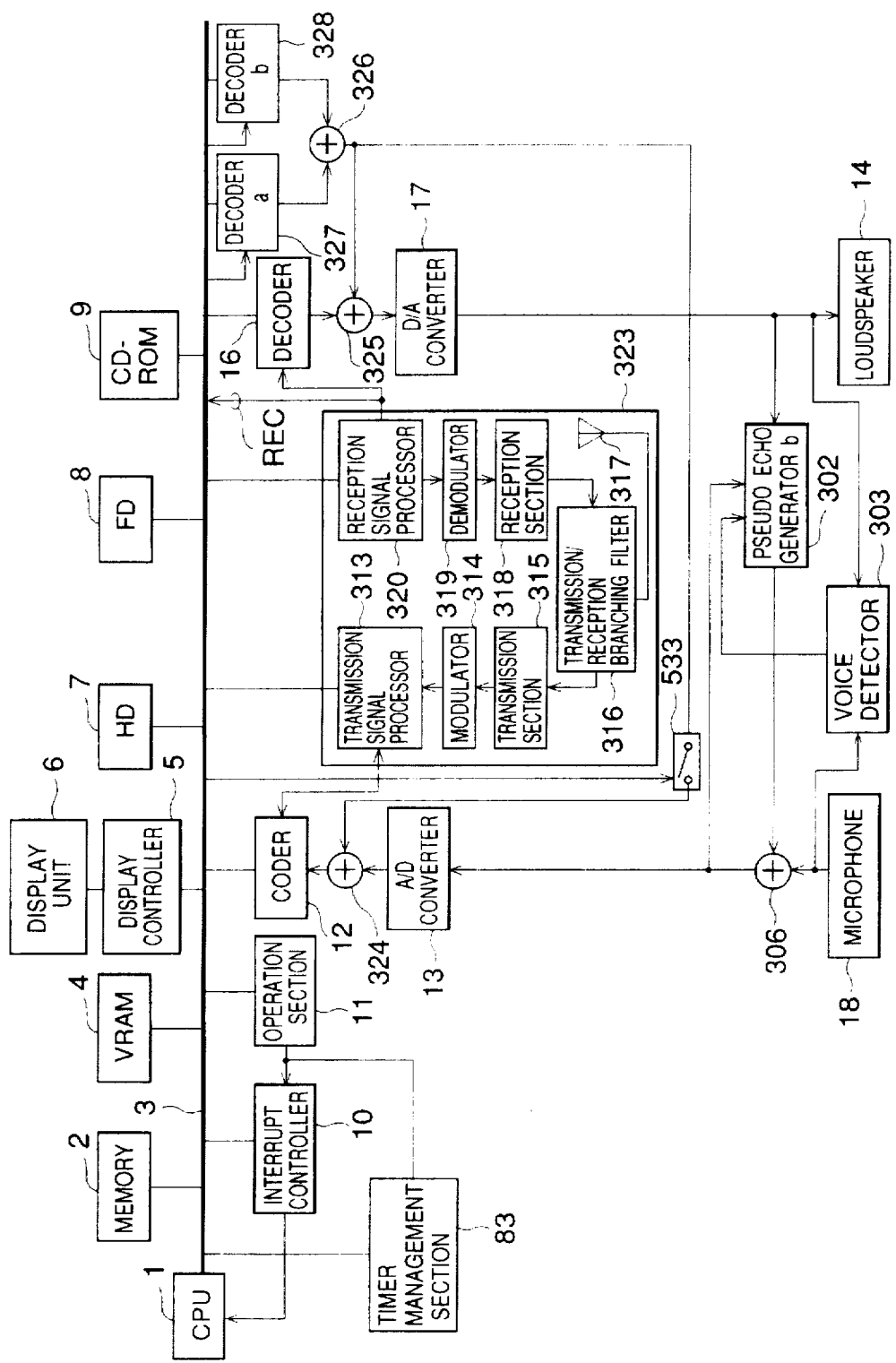
FIG. 43 is a block diagram showing the system configuration according to another embodiment of the invention.

Next, FIG. 43 shows another embodiment using a portable telephone, which is a hands-free telephone. The embodiment in FIG. 43 differs from that in FIG. 42 in that an A/D converter 13, D/A converter 17, coder 12, and encoder 16 in FIG. 43 also serve as the A/D converter t 311, D/A converter t 322, coder t 312, and decoder t 321 in FIG. 42.

A signal flow will be discussed.

A transmission voice is converted into a digital signal through a microphone 18 and the A/D converter 13 and the digital signal is compressed by the coder 12. Next, the compressed signal is sent to a transmission signal processor 313, which then adds an error correction code, etc., to the signal. Then, the signal is converted into the digital signal transmission format and sent to a modulator 314. However, addition of the error correction code is not necessarily required depending on the signal processing method. The modulator 314 executes π/4 shift QPSK modulation, for example. After the signal is modulated, it is sent via a transmission section 315 and a transmission/reception branching filter 316 to an antenna 317 from which the signal is transmitted to space as a transmission wave.

On the other hand, a reception wave is received by the antenna 317 and sent via the transmission/reception branching filter 316 and a reception section 318 to a demodulator 319, which then detects it and converts into a base band signal, then demodulates the signal to recover the original digital signal. After this, a reception signal processor 320 extracts data from the receive data format and performs error correction processing for the data. However, the error correction processing is not necessarily required depending on the signal processing method. Next, the signal is expanded by the decoder 16 and converted into an analog signal by the D/A converter 17, then the signal is reproduced as a voice signal from a loudspeaker 14.

Figure 44:
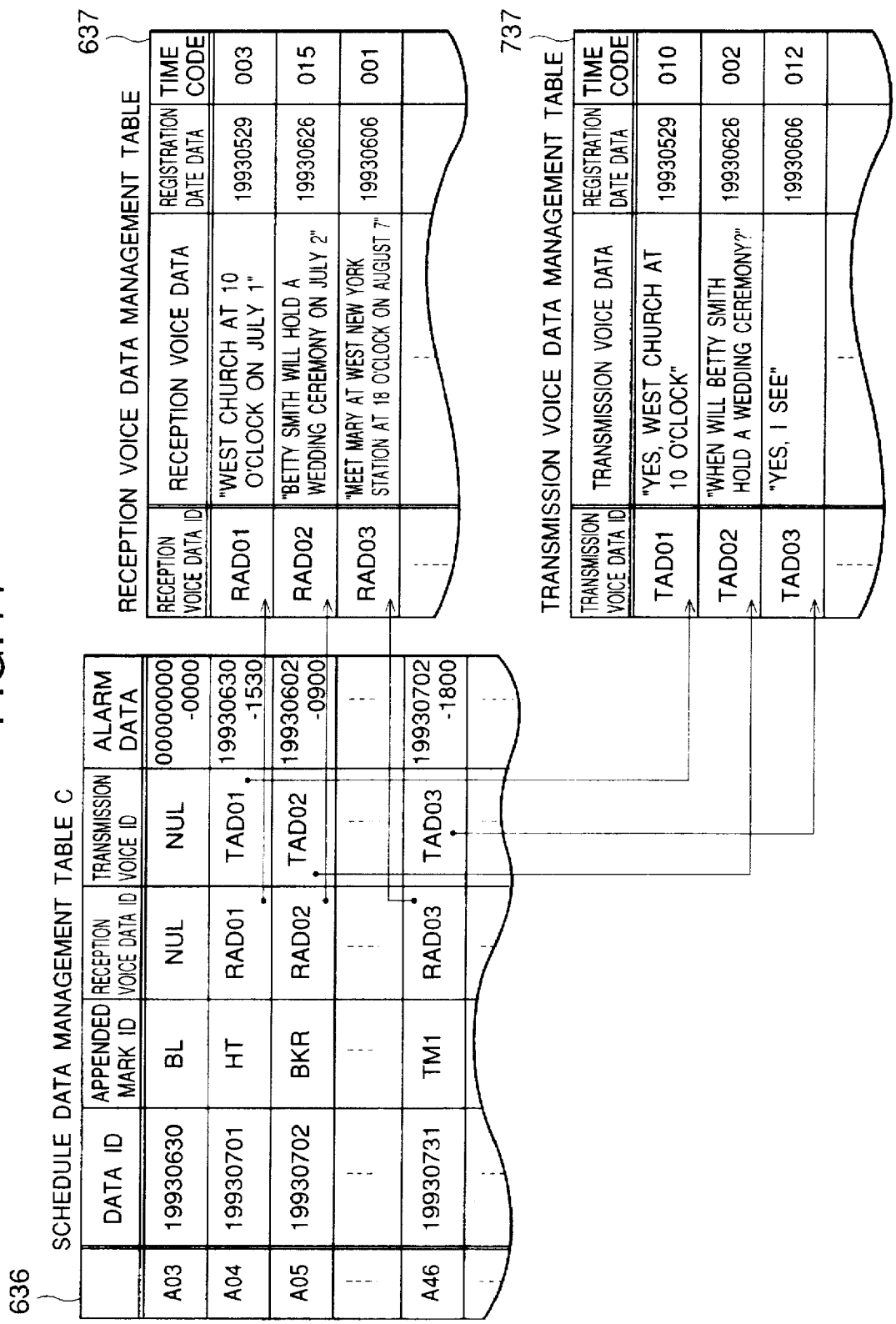
FIG. 44 is an illustration showing tables used for storing voice data in the system in FIG. 43.

To register a voice memo, the user touches the touch key VOICE MEMO 24 in FIG. 2 and receives the reception contents from the associated party or speaks a memo topic. Then, the system in FIG. 43 prepares the voice memo by either of the following two methods:

First, for the reception contents, digital voice data output from the reception signal processor 320 is passed through REC connected to a bus and is assigned a reception voice data ID and they are registered in a reception voice data management table 637 in FIG. 44(the ID is also registered in a schedule data management table C 636 in FIG. 44). These tables are provided in a memory 2, for example.

On the other hand, the transmission voice of the memo topic spoken by the user (transmission contents sent to the associated party) is fed through a microphone 18 to the A/D converter, which then converts it into a digital signal, which then is compressed by the coder 12. After this, the voice data is assigned a transmission voice data ID and they are registered in a transmission voice data management table 737 in FIG. 44 (the ID is also registered in the schedule data management table C 636).

Next, to check an already registered voice memo, the user touches CHECK 27 in FIG. 2, then the system retrieves the voice memo to be checked in the schedule data management table C 636, the reception voice data management table 637, and the transmission voice data management table 737 as specified by the user, and outputs the found voice memo. At the time, the reception voice data is expanded by a decoder a 327; on the other hand, the transmission voice data is expanded by a decoder b 328, then outputs of the decoder a 327 and b 328 are added by an adder 326. The resultant signal is passed through an adder 325 and converted into an analog voice by the D/A converter 17. The analog voice is output from the loudspeaker 14.

When the voice memo is checked, the reception voice data actually received and output from the reception signal processor 320 is expanded by the decoder 16, then is added to the output from the adder 326 by the adder 325. Therefore, the voice memo specified by the user to check it and the reception voice of the associated party received at the time can be output from the loudspeaker 14 at the same time.

In the description in FIG. 43, the decoding section is provided with three channels of the decoders 325, a 327, and b 328. However, the invention is not limited to the number of decoders or the configuration. The components in the decoding section can also be reduced by providing a switch, etc. In this case, however, the voice memo and the reception voice from the associated party actually received may be unable to be output from the loudspeaker 14 at the same time or the voice memo may be limited to either the reception voice or transmission voice.

By the way, time codes indicating the time at which reception voice data and transmission voice data are actually stored after VOICE MEMO 24 in FIG. 2 is touched are also recorded in the reception voice data management table 637 and the transmission voice data management table 737. The time code is used to synchronize reception voice data and transmission voice data output when voice memo is output from the loudspeaker 14 as analog voice for checking when VOICE MEMO 24 in FIG. 2 is touched. The time code is not indispensable and after VOICE MEMO 24 in FIG. 2 is touched, reception voice data and transmission voice data may always be registered at the same time. However, for example, although there is no transmission voice data, silent transmission voice data will always be registered and meaningless data will be registered, resulting in waste use of the registration areas (memory 2, HD 7, FD 8, etc.,). This means that the time code is provided for not only synchronizing reception voice data and transmission voice data output, but also saving the reception and transmission voice data registration areas.

A specific example of the above-mentioned processing will be discussed with reference to FIG. 44. For example, to register the telephone reception contents of "WEST CHURCH AT 10 O'CLOCK ON JULY 1" from the associated party in the schedule management system, first, RAD01 of a reception voice data ID is assigned to the digital voice data output from the reception signal processor 323 and the data and ID are registered in the reception voice data management table 637 (the ID is also registered in the schedule data management table C 636). Further, if the user speaks "YES, WEST CHURCH AT 10 O'CLOCK" as a transmission voice, it is passed through the microphone 18, the A/D converter 13, and the coder 12 and TAD01 of a transmission voice data ID is assigned to the transmission voice data. The data and ID are registered in the transmission voice data management table 737 (the ID is also registered in the schedule data management table C 636).

To again output the voice memo from the loudspeaker 14 for checking, first the reception voice data "WEST CHURCH AT 10 O'CLOCK ON JULY 1" is output after a lapse of three seconds of the silence time after VOICE MEMO 24 is touched from the time code values of the reception voice data and the transmission voice data, which will be hereinafter in second units for simplicity. Next, the transmission voice data "YES, WEST CHURCH AT 10 O'CLOCK" is output in 10 seconds. However, the reception voice data and the transmission voice data are output consecutively from the loudspeaker 14, thus the user hears as if their conversation at the registration were output as voice memo. If the time codes are not provided, the reception voice data and the transmission voice data are output at the same time, thus while the reception voice data "WEST CHURCH AT 10 O'CLOCK ON JULY 1" is output, silence data is output as the transmission voice data. On the other hand, while the transmission voice data "YES, WEST CHURCH AT 10 O'CLOCK" is output, silence data is output as the reception voice data. Here, the time code values are in second units, but the time code value units are not limited to seconds if the time data can be used to synchronize reception voice data and transmission voice data output.

When the voice memo is checked, the system turns off an SW 533 at the same time as the user touches CHECK 27 in FIG. 2, whereby the voice memo data is not input to an adder 324, thus processing of the coder 12 and the transmission signal processor 313 to antenna 317 is not performed, preventing the associated party from hearing the voice memo at the communication.

However, if the user wants the associated party to hear the voice memo, he or she touches OPEN 77 in FIG. 8 for restoring the SW 533 to the ON position, whereby the voice memo is output from the loudspeaker 14 via the adder 325 and the D/A converter 17 and is also input to the adder 324 and processing of the coder 12 and the transmission signal processor 313 to antenna 317 is performed. Thus, the voice memo is also output from the antenna 317, enabling the associated party to hear it together with the transmission voice of the user.

By the way, the reception contents are registered in the voice data column in the voice data management table 37 used with the embodiments discussed with reference to FIGS. 1 and 42 for simplicity of the description. However, the voice data that can be registered in the voice data management table 37 is not limited to the reception contents. In FIG. 43, the reception voice data management table 637 for reception voice and the transmission voice data management table 737 for transmission voice are provided, but the configurations of the embodiments in FIGS. 1 and 42 eliminate the need for separately registering the reception voice data and transmission voice data and enable both the reception and transmission voice data to be registered together in the area of the voice data management table 37.

The function of a pseudo echo generator b 302 and its peripheral for preventing howling noise in the hands-free telephone is the same as that discussed with reference to FIG. 1 and therefore will not be discussed again.

Figure 45:
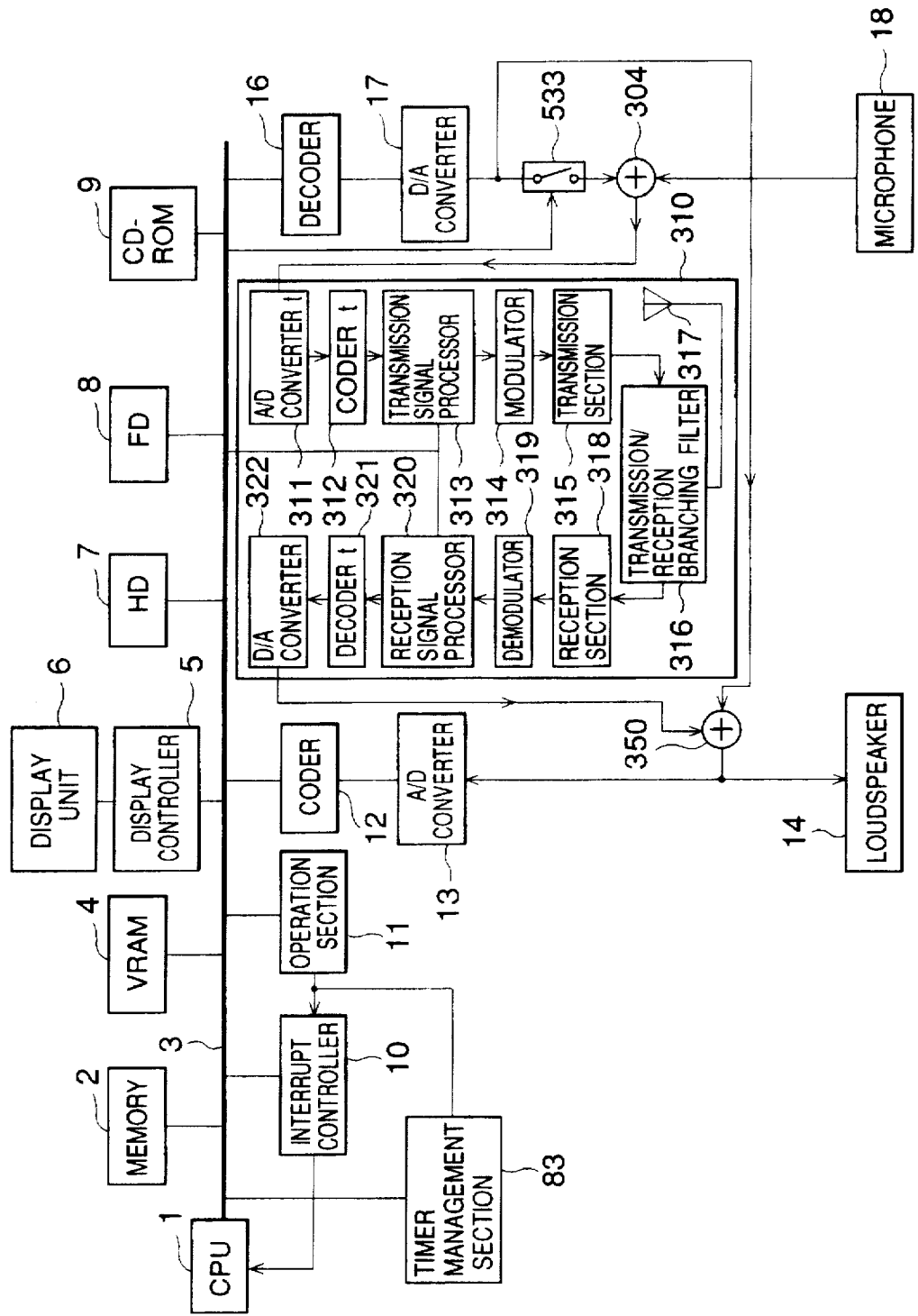
FIG. 45 is a block diagram showing the system configuration applied to a telephone using a handset from the system in FIG. 42.
Figure 46:
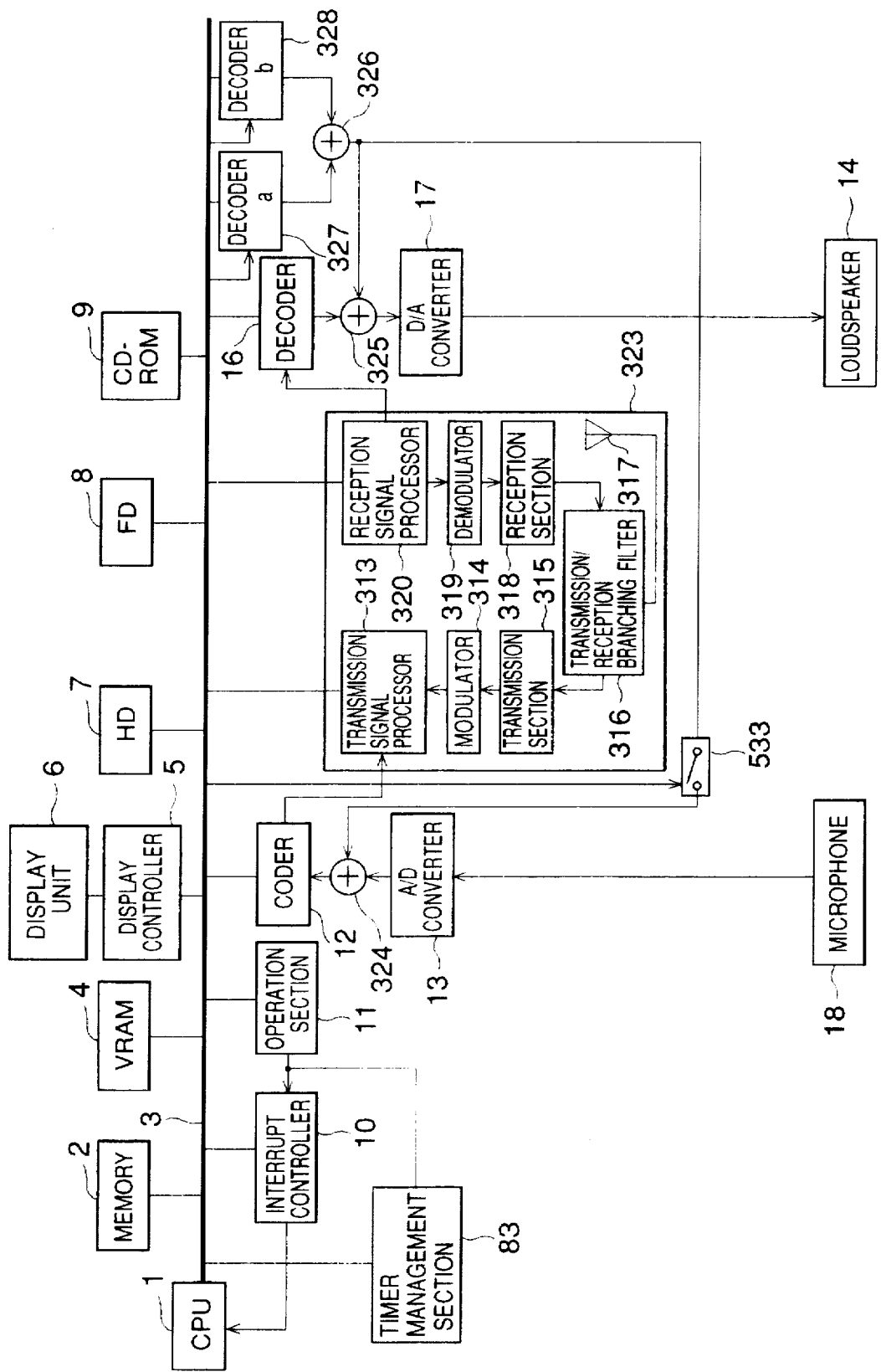
FIG. 46 is a block diagram showing the system configuration applied to a telephone using a handset from the system in FIG. 43.

FIGS. 45 and 46 show embodiments using a portable telephone with a handset rather than a portable hands-free telephone, which are the same as those shown in FIGS. 42 and 43 in operation and function and therefore will not be discussed again.

According to the embodiments, the user can directly make the most of telephone conversation, voice information of electronic mail, etc., using a schedule displayed on the screen without performing complicated operation at a conventional input device, so that the user can enter the schedule contents promptly. Since the user directly enters conversation, electronic mail voice information, etc., in the system, the system enables the user to avoid an input error which may occur if he or she handles conventional input devices, enabling the user to enter a schedule accurately.

Figure 22:
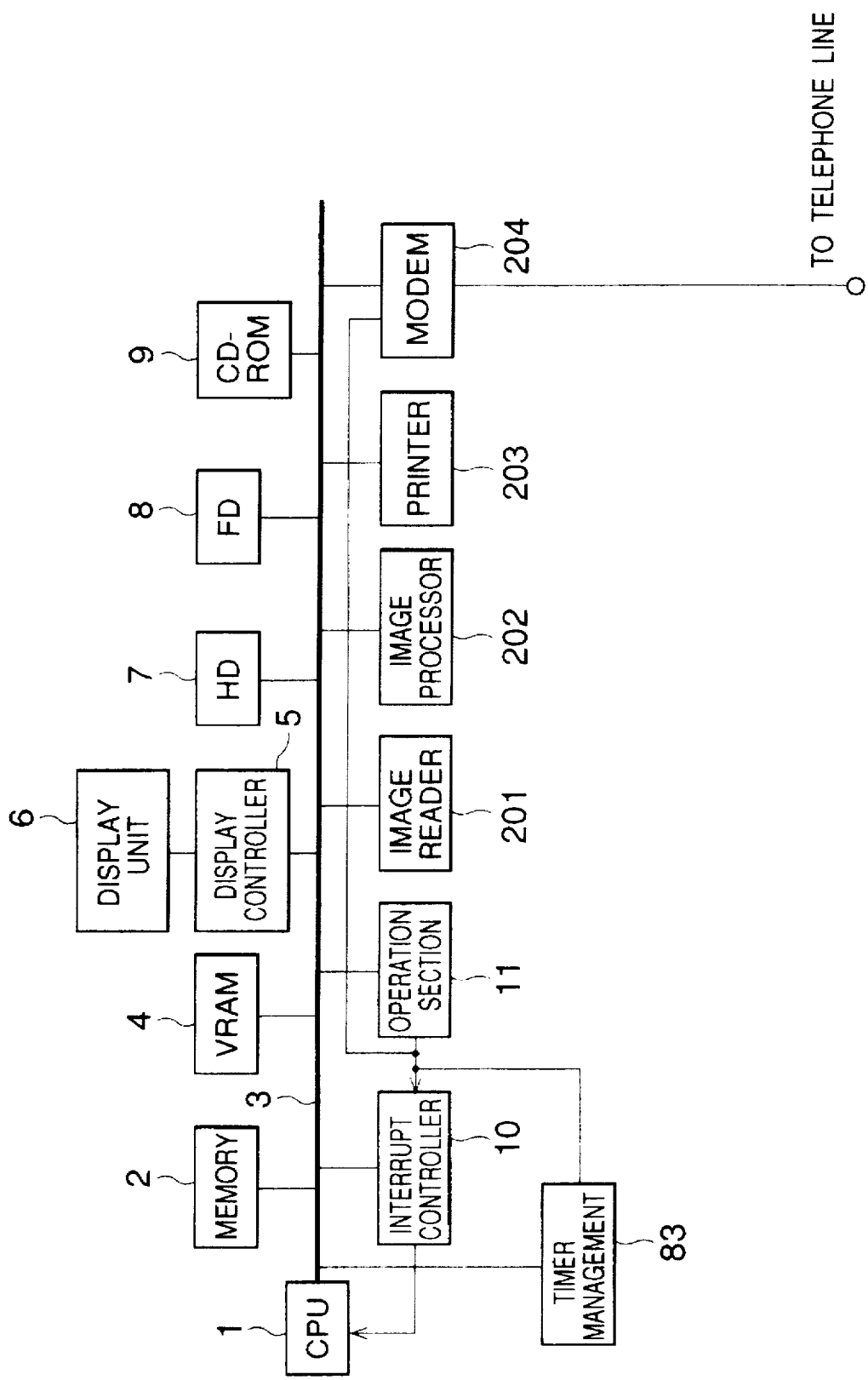
FIG. 22 is a block diagram showing the system configuration according to another embodiment of the invention.

Next, another embodiment of the invention will be discussed. FIG. 22 is a block diagram showing the system configuration according to the embodiment of the invention. The embodiment handles an image instead of a voice in the embodiments we have discussed. Of course, it is also made possible to handle both voice and images. Here, for simplicity, a system which handles only images will be described. Components identical with or similar to those previously described are denoted by the same reference numerals in the embodiment.

First, in FIG. 22, numeral 1 is a CPU, numeral 2 is a memory (containing RAM, ROM, and flash memory), numeral 3 is a local bus, numeral 4 is a display memory (VRAM), numeral 6 is a display unit made of, for example, a liquid crystal display, numeral 5 is a drive of the display unit 6, numeral 7 is a hard disk drive and controller (HD), numeral 8 is a floppy disk drive and controller (FD), numeral 9 is a CD-ROM drive and controller (CD-ROM), numeral 10 is an interrupt controller for outputting an interrupt control signal for interrupting the CPU 1, numeral 83 is a timer management section for managing time data and when the user-specified time is reached, for outputting an interrupt control signal to the interrupt controller 10, and numeral 11 is an operation section for getting user entries, etc., through an input device consisting of buttons or a tablet or the like and operating the components in FIG. 22.

Further, the embodiment contains members for providing functions equivalent to a facsimile (FAX): Numeral 201 is an image reader, numeral 202 is an image processor, numeral 203 is a printer, and numeral 204 is a modem.

The HD 7, FD 8, and CD-ROM 9 shown in FIG. 22 are provided as data recording and read devices, but not necessarily all the three devices are required; desired ones can be selected among them in the range in which the invention described here can be embodied.

Figure 23:
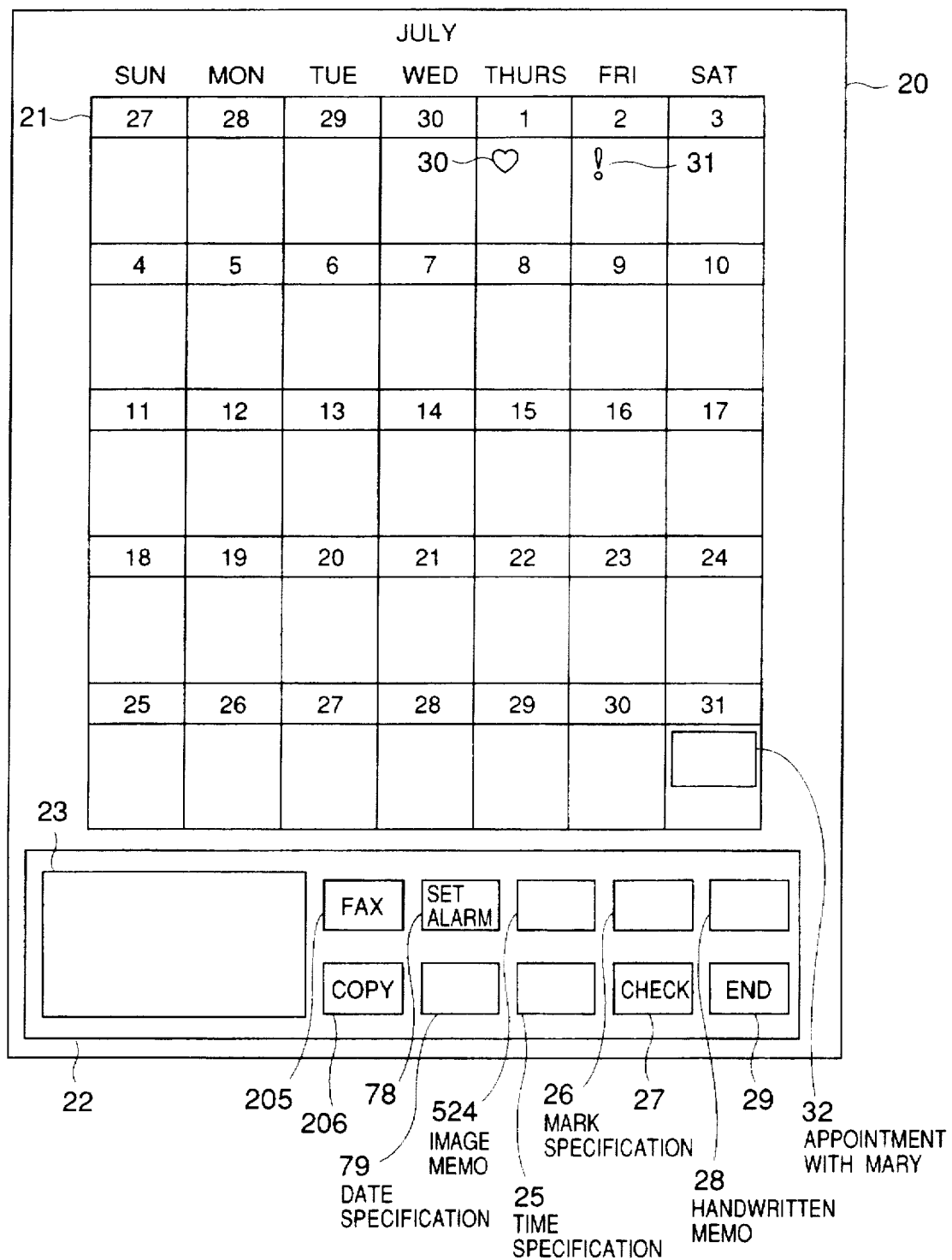
FIG. 23 is an illustration of a calendar displayed on a display screen in the system in FIG. 22.
Figure 24:
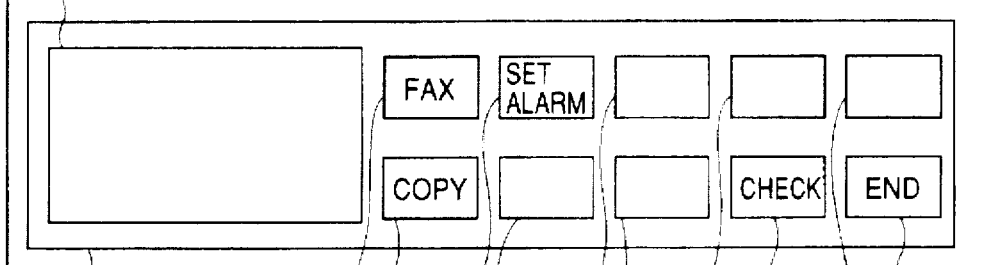
FIG. 24 is an illustration showing the correspondences between date regions of the calendar in FIG. 23 and addresses.
Figure 30:
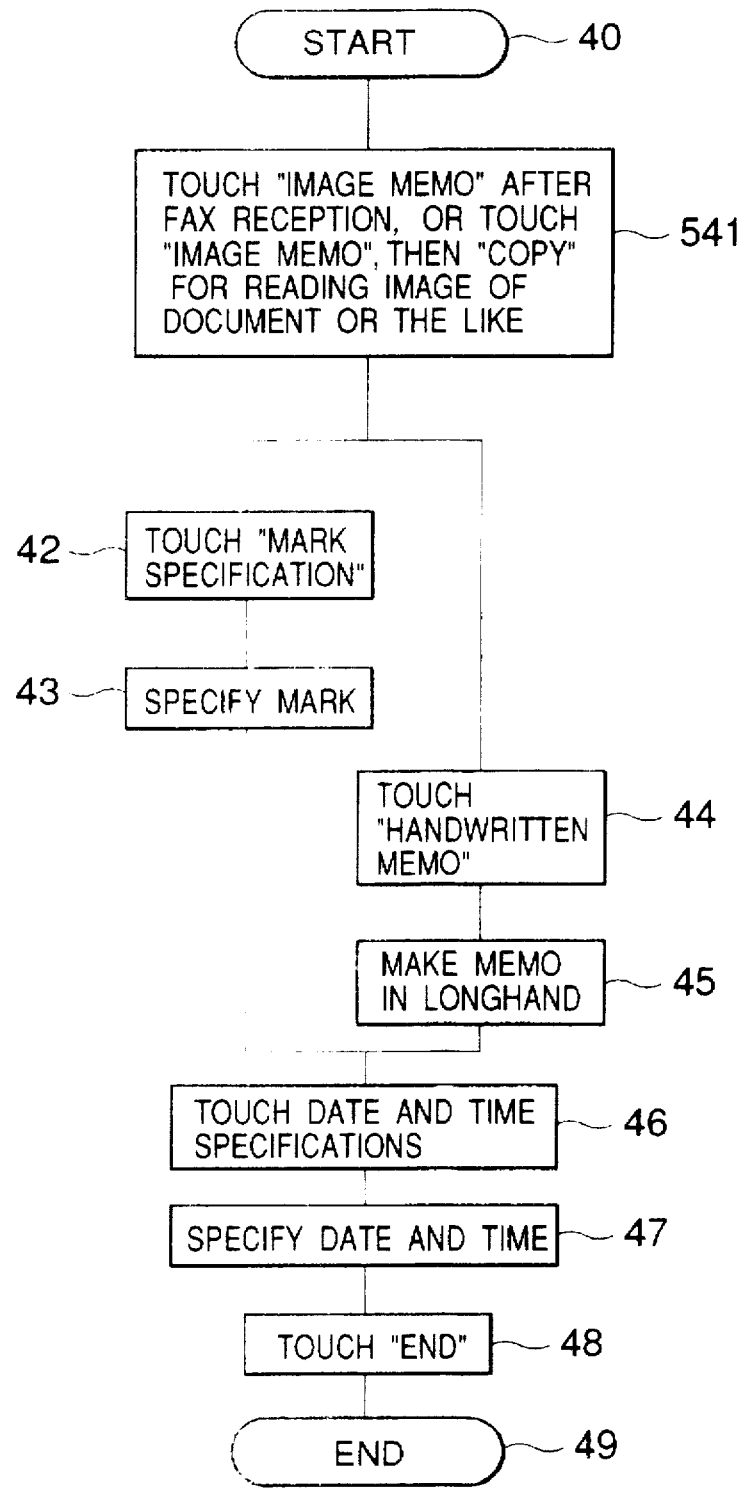
FIG. 30 is a flowchart showing a user operation procedure in the system in FIG. 22.
Figure 31:
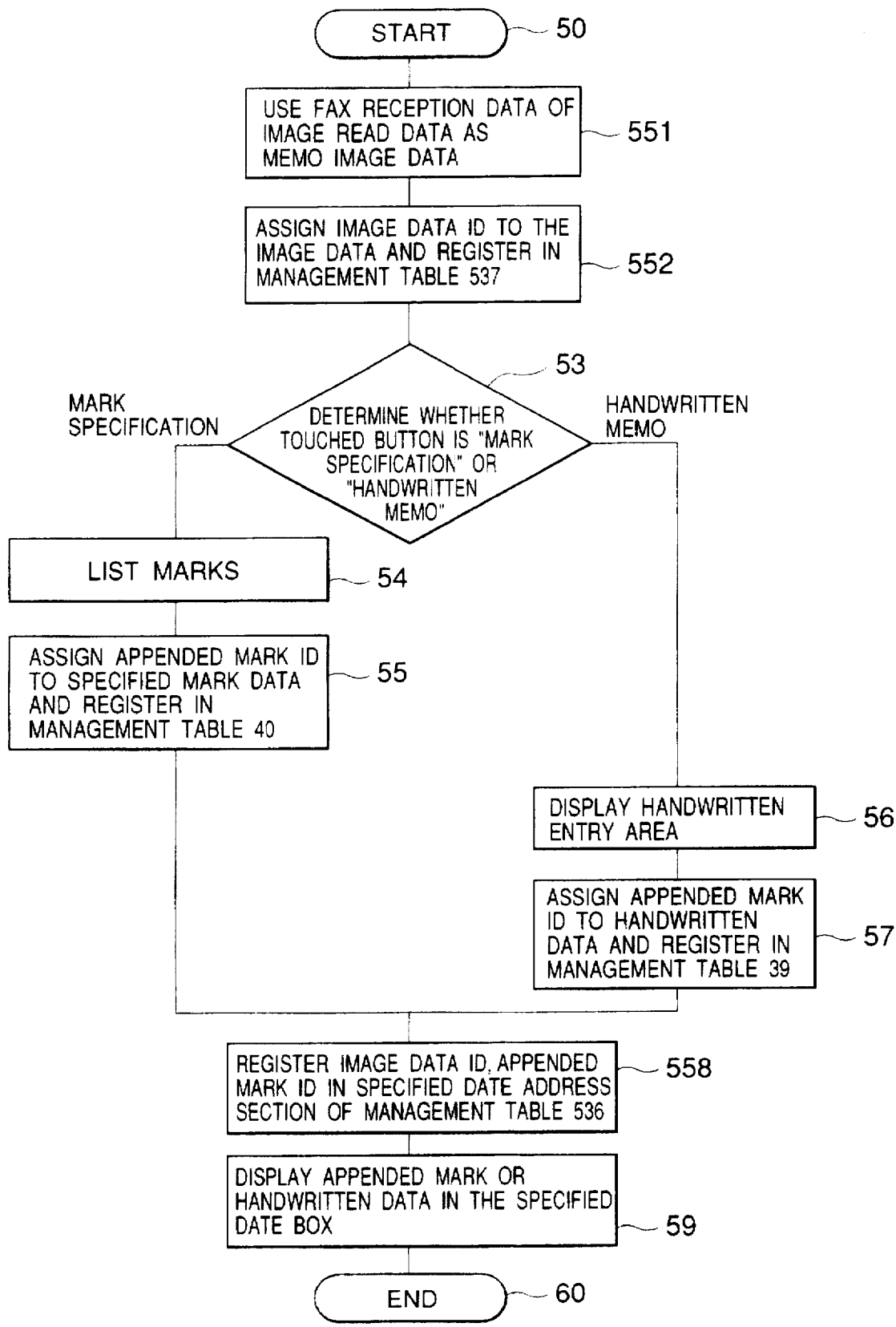
FIG. 31 is a flowchart showing a flow of system processing performed according to the user operation in FIG. 30.
Figure 32:
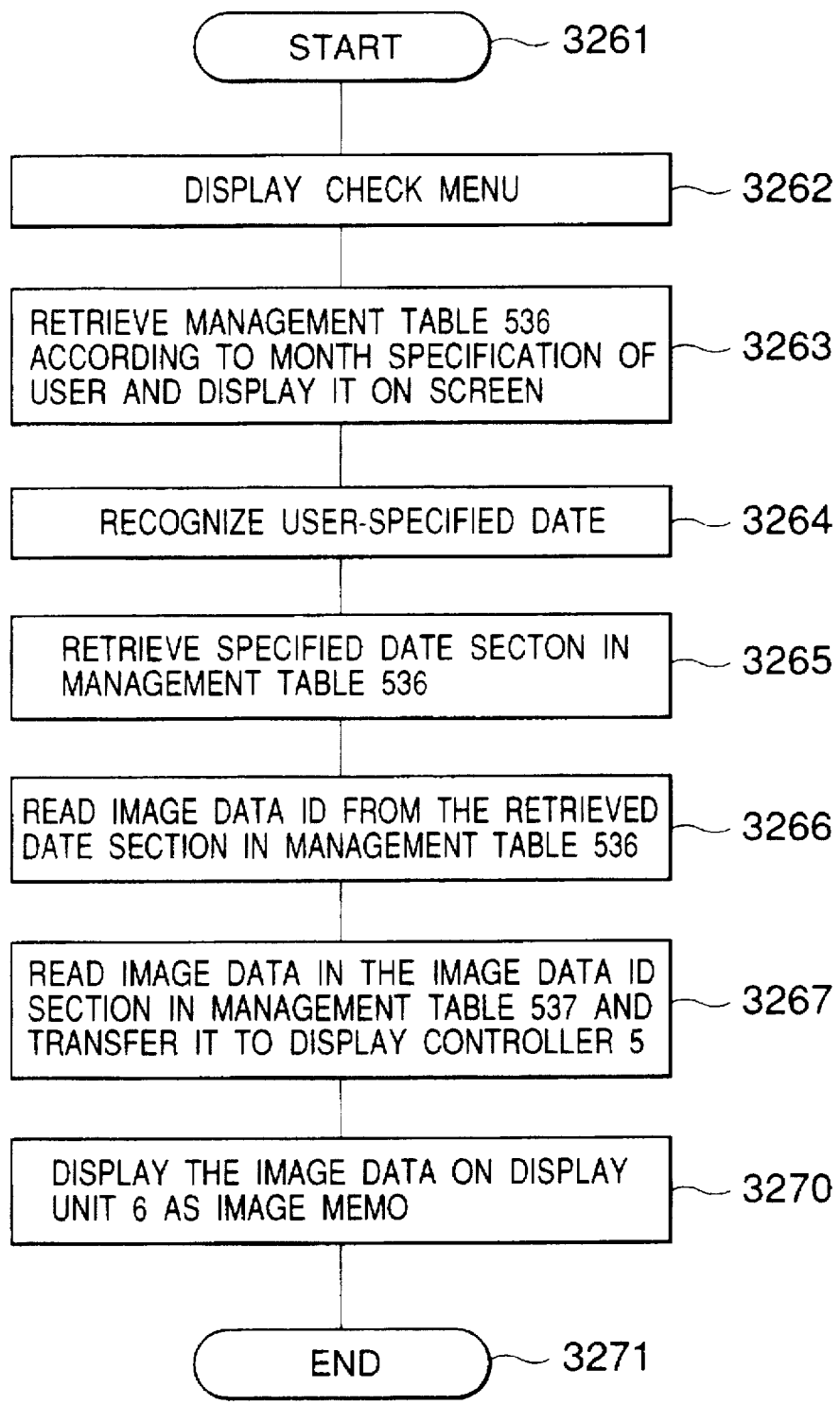
FIG. 32 is a flowchart showing a check (retrieval) process flow in the system in FIG. 30.

FIG. 23 illustrates a monthly calendar screen displayed to use the embodiment as the schedule management system. FIG. 24 shows the relationship between date boxes and addresses for the display screen in FIG. 23. FIGS. 25 to 29 are illustrations of tables used to register the schedule contents in relation to the dates. FIG. 30 is a flowchart showing a user operation procedure to register the schedule contents. FIG. 31 is a flowchart showing system processing to register the schedule contents. FIG. 32 is a flowchart showing system processing for the user to check the registered schedule contents. FIGS. 33–35 and 40 are illustrations showing screens displayed for the user to check the schedule contents.

Processing for the user to register image data received by facsimile or paper space of a postcard, letter, or the like as a schedule will be described.

In FIG. 22, the contents received by facsimile via the modem 204 over a telephone line are processed by the image processor 202, then stored in the memory 2 or HD 7 or FD 8 via the local bus 3 as an image memo, or paper space of a postcard, letter, or the like is read by the image reader 201 and processed by the image processor 202, then stored in the memory 2 or HD 7 or FD 8 via the local bus 3 as an image memo.

The user operation and data process flow will be discussed with reference to FIGS. 30, 31, 23, and 25–29.

To register an image memo, the user touches IMAGE MEMO 524 in FIG. 23 after facsimile reception. On the other hand, to read paper space of a postcard, letter, or the like into the system, the user sets the paper sheet of the postcard, letter, or the like and COPY 206 while touching IMAGE MEMO 524 in FIG. 23 for reading it through the image reader 201 at step 541 in FIG. 30.

Figure 26:
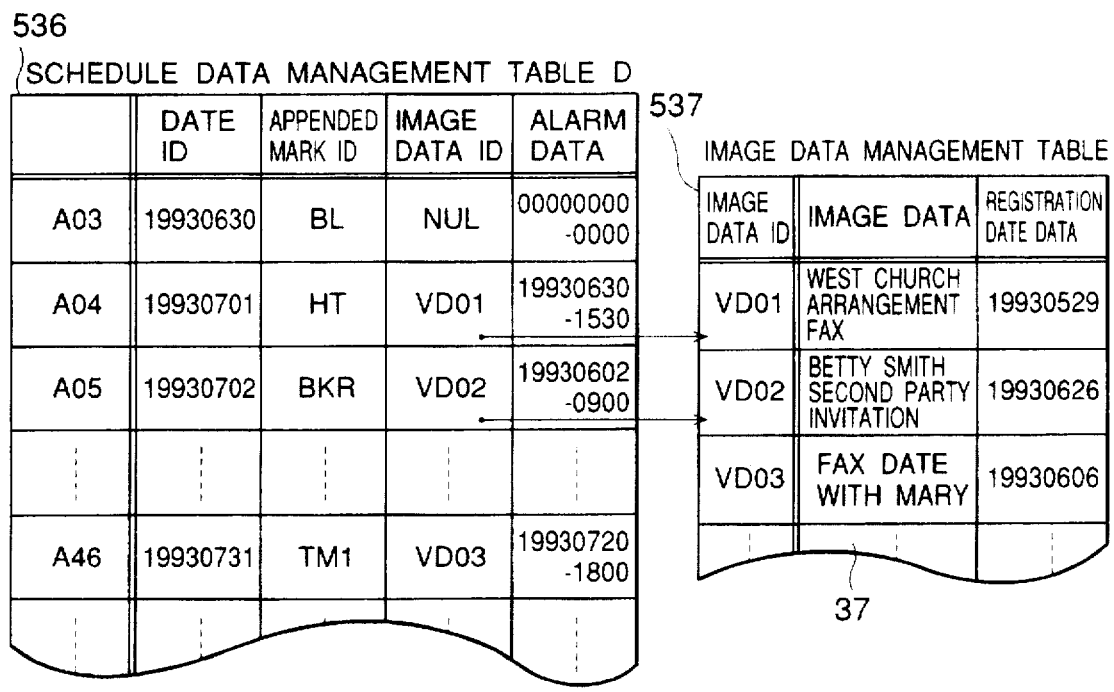
FIG. 26 is an illustration showing a table used with the schedule data management table in FIG. 25.

In response to the operation, the system in FIG. 22 uses the image data received by facsimile or the data on the paper space of the postcard, letter, or the like read by the image reader 201 as image data at step 551 in FIG. 31, assigns an image data ID to the image data, and registers them in an image data management table 537 in FIG. 26 at step 552 as an image memo.

Next, the user specifies indication of a mark or handwritten memo (symbol) to express registration of the image memo in the schedule management system on the display screen in FIG. 23. If the user wants mark indication, he or she touches MARK SPECIFICATION 26 at step 42 in FIG. 30 to specify a mark at step 43. Then, when the operation section 11 in the system detects a touch of MARK SPECIFICATION 26, prepared marks are listed in a display area 23 at step 54 in FIG. 31.

Next, based on the user specification, an appended mark ID is assigned to the specified mark data and they are registered in an appended mark management table 40 in FIG. 29 at step 53 in FIG. 31.

If the user wants to append handwritten data rather than marks, he or she touches HANDWRITTEN MEMO 28 at step 44 in FIG. 30 for entering a handwritten memo at step 45. Then, when detecting a touch of HANDWRITTEN MEMO 28, the system displays a handwritten input area in the display area 23 or the date boxes in FIG. 23 at step 56 in FIG. 31, assigns an appended mark ID to the user-entered handwritten data through the operation section 11, and registers them in a handwritten data management table 39 in FIG. 28 at step 57 in FIG. 31.

Further, to set the date and time on which the image memo is registered, the user touches DATE SPECIFICATION 79 and TIME SPECIFICATION 25 at step 46 in FIG. 30 and specifies the date and time at step 47, then touches END 29 at step 48 for completing the registration at step 49 in FIG. 30.

Figure 25:
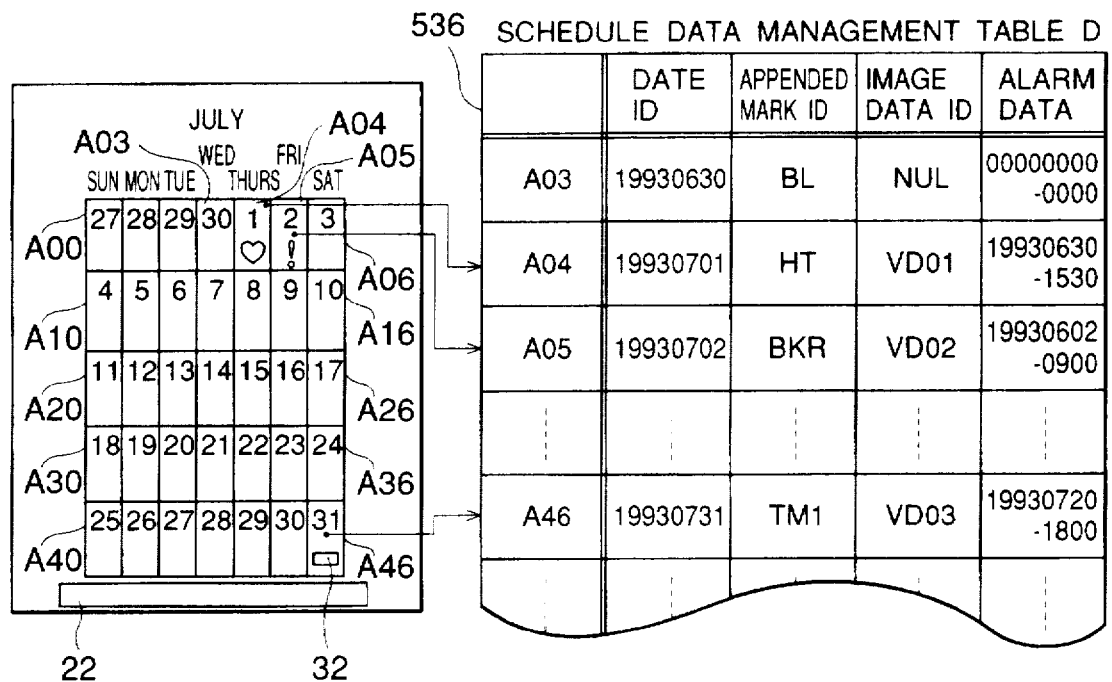
FIG. 25 is an illustration showing a schedule data management table used in the system in FIG. 22.

The system registers the voice data ID, appended mark ID, or handwritten data ID in the user specification date section of the schedule data management table D 536 in FIG. 25 at step 558 in FIG. 31, then displays the appended mark or handwritten data in the specified date box in FIG. 23 at step 59 for indicating to the user that registration has been made, and completes the registration process at step 60.

A specific example of the processing is given below: To register the image information "ARRANGEMENT AS TO WEDDING CEREMONY (ARRANGEMENT AT WEST CHURCH AT 10 O'CLOCK ON JULY 1)" received by facsimile in the schedule management system, first, VD01 of image data ID is assigned to the image data and they are registered in the image data management table 537 in FIG. 26. If the user specifies appending of a heart mark to the image data, the system assigns HT of appended mark ID to the heart mark data and registers them in the appended mark management table 40 in FIG. 29.

To register the image data in the July 1 box in FIG. 23 as specified by the user, HT of the appended mark ID and VD01 of the image data ID are registered in the section of the date box address A04 corresponding to the date in the schedule data management table 536. Upon completion of the registration, a heart mark is appended to the July 1 box in FIG. 23.

If the user wants to append a handwritten memo to the image data, TM1 of appended mark ID is assigned to handwritten data as shown in FIG. 28, for example, "APPOINTMENT WITH MARY," then they are registered in the handwritten data management table 39. Next, TM1 of the appended mark ID and VD03 of the image data ID are registered in the section of the date box address A46 corresponding to July 31 in FIG. 23 as specified by the user in the schedule data management table 536. Upon completion of the registration, the handwritten data "APPOINTMENT WITH MARY" 32 is appended to the July 31 box in FIG. 23.

If the user receives postcard "INVITATION TO SECOND PARTY OF BETTY SMITH WEDDING CEREMONY AT HOTEL CASTLE AT 16 O'CLOCK ON JULY 2" and registers the postcard in the schedule management system, first, VD02 of an image data ID is assigned to the image data of the space of the postcard read by the image reader 201 and they are registered in the image data management table 537 in FIG. 26. To append an exclamation mark to the image data, BRK of an appended mark ID is assigned to the exclamation mark data and they are registered in an appended mark management table 40 in FIG. 29.

To register the image data in the July 2 box in FIG. 23 as specified by the user, BRK of the appended mark ID and VD02 of the image data ID are registered in the section of the date box address A05 corresponding to the date in the schedule data management table 536. Upon completion of the registration, the exclamation mark is appended to the July 2 box in FIG. 23.

FIG. 27 shows a date data management table which stores dates and attributes corresponding monthly to the date boxes A00–A46 in FIG. 23. The attributes include, for example, festival days, religiously or practically significant days, lucky days, and festival avoidance days. The date data management table 38 can be looked up in by reading data stored in the ROM, RAM, or flash memory in the memory 2 or the HD 7 or using the FD 8 or CD-ROM 9 for reading data stored on recording media.

If the data management tables 536, 537, 39, and 40 in FIGS. 25, 26, 28, and 29 described above are stored in the ROM, RAM, or flash memory in the memory 2, the top address of each data entry can be used for the identifier (ID) of the data entry; if the tables are stored as files on the recording media used with the HD 7 or FD 8, file names can be used for the IDs of the files. This also applies to the date data management table 38 in FIG. 27.

The data for appended marks can also be stored in the ROM, RAM, or flash memory in the memory 2 or the HD 7 or as files on the recording media used with the FD8 or CD-ROM 9, and be read whenever necessary for reference. Thus, the user can also prepare or change his or her desired marks and store them in the above-mentioned store area for later read and use.

As shown in FIG. 24, the addresses are related to the boxes assigned to monthly dates corresponding to a general calendar: A00 to A06 are related to Sunday to Saturday in the first week, A10 to A16 are related to Sunday to Saturday in the second week, A20 to A26 are related to Sunday to Saturday in the third week, A30 to A36 are related to Sunday to Saturday in the fourth week, and A40 to A46 are related to Sunday to Saturday in the fifth week.

When a voice memo is registered, its appended mark or handwritten memo is displayed together with the date in the corresponding box of A00–A46. With a tablet overlaid in the display screen 20, the user sees displayed dates in registration of a voice memo and specifies his or her desired registration date with a finger, pen, or the like. This feature is used when the address of the specified date (A00–A46) is gotten through the operation section 11 and image data, etc., is registered in the management table 536 in relation with the display screen.

However, as described above, if a number of related addresses in FIG. 24 are provided for one date, as many schedule entries as the number of the addresses provided for a single date can be registered.

In FIG. 24, one address is related to one date for simplicity. This does not limit the number of registered schedule entries per date of the invention.

Next, processing for the user to check the registration contents in the schedule management system will be discussed with reference to FIGS. 22–29, 32, and 33.

FIG. 32 is a flowchart showing a processing flow of the schedule management system for the user to check the registration contents. FIG. 33 is an illustration showing an operation screen displayed when the user touches CHECK 27 check in FIG. 23.

When the user touches CHECK 27 in FIG. 23, the process shown in FIG. 32 is started at step 3261, and the operation screen 22 in FIG. 33 is displayed for the user. After the user touches MONTH SPECIFICATION 73, the system accepts the user-entered month for check and retrieves the management table 536 of the month based on the date ID in FIG. 25. If the current month displayed on the screen 20 in FIG. 33 is not the desired month, the system changes the screen display to that corresponding to the desired month based on the management table 536 at step 3263. Seeing the display screen, the user specifies the date box to be checked with a finger, pen, or the like. Then, the system recognizes the address of the specified date box at step 3264 through the tablet, operation section 11, and retrieves the specified date section in the management table 536 at step 3265 for reading the image data ID at step 3266. Next, the system reads the image data related to the image data ID from the management table 537 in FIG. 26 and transfers it to the display controller 5 in FIG. 23 at step 3267. After this, the image data is displayed on the display unit 6 as the image memo at step 3270.

Figure 34:
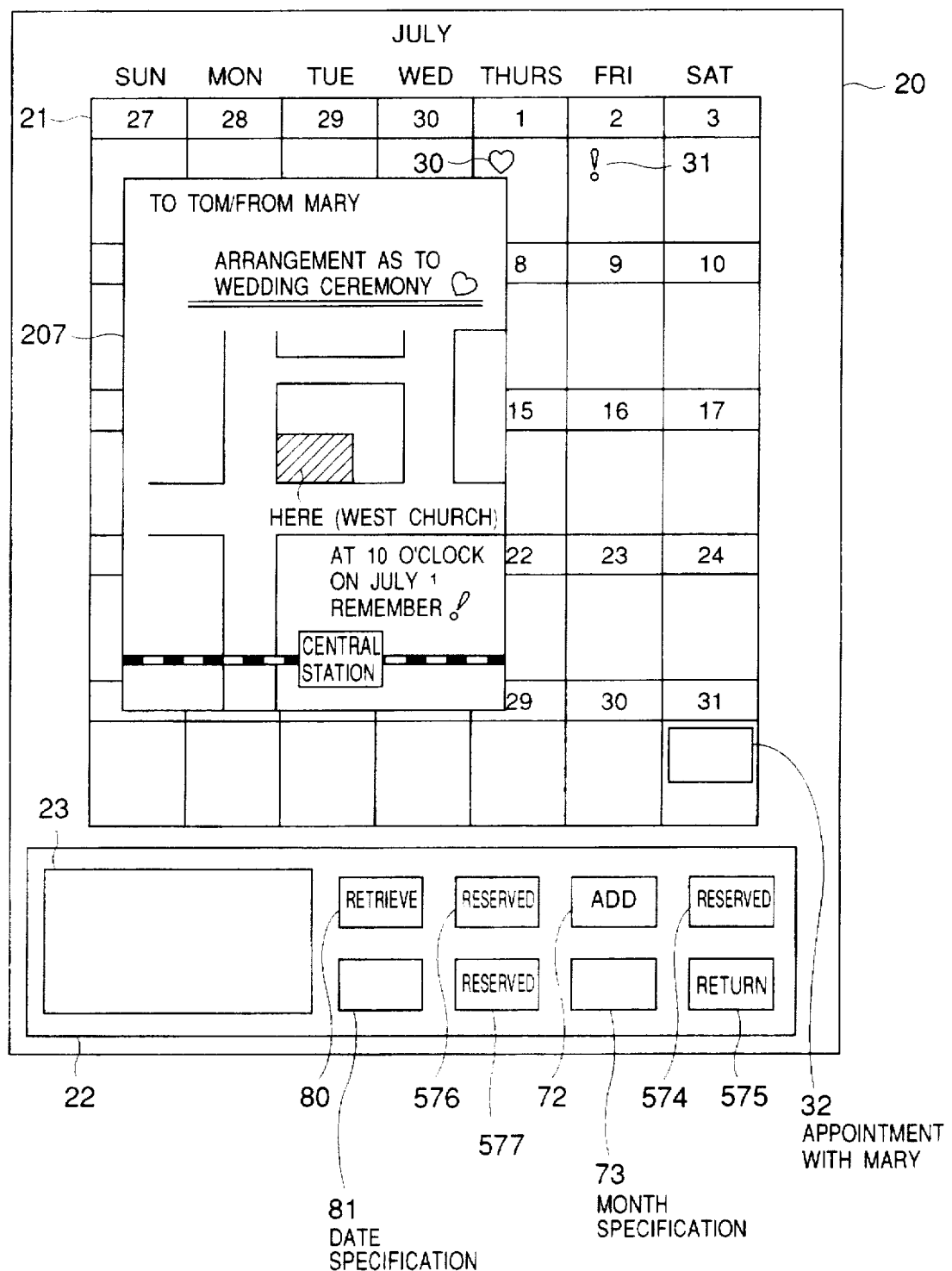
FIG. 34 is an illustration showing an image memo example when image memo is checked in the check process in FIG. 32.

In FIG. 34, a check screen of the schedule expressed by a heart mark 30 in the July 1 date box is displayed; the image memo "ARRANGEMENT AS TO WEDDING CEREMONY (ARRANGEMENT AT WEST CHURCH AT 10 O'CLOCK ON JULY 1)" received by facsimile is displayed on a subscreen (window) 207.

Figure 41:
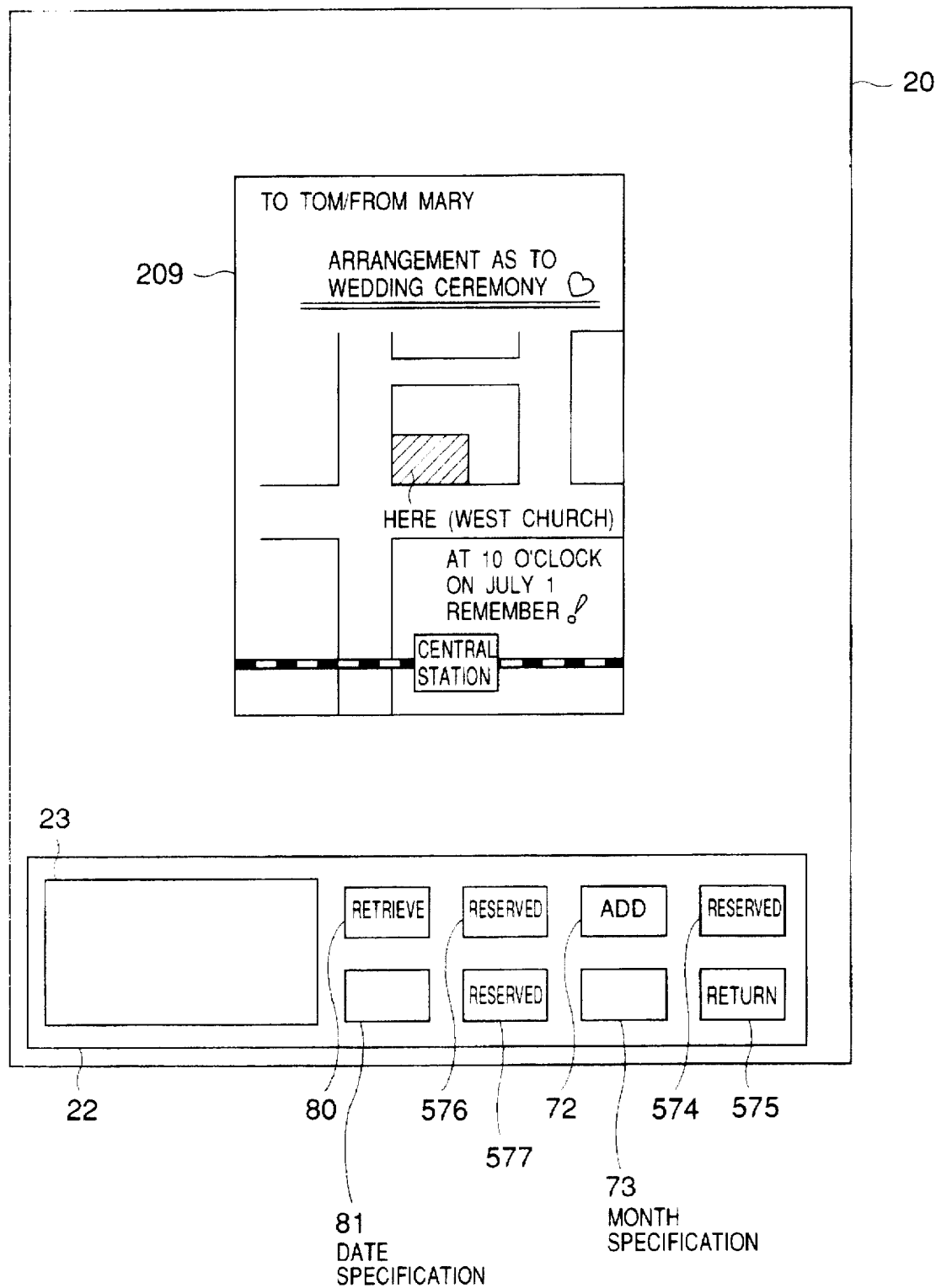
FIG. 41 is an illustration showing a modified form of the display screen in FIG. 34.

FIG. 41 shows an alternative display method to that in FIG. 34; the image memo "ARRANGEMENT AS TO WEDDING CEREMONY (ARRANGEMENT AT WEST CHURCH AT 10 O'CLOCK ON JULY 1)" 209 received by facsimile is only displayed without displaying the subscreen 207.

Figure 35:
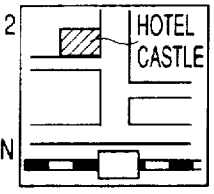
FIG. 35 is an illustration showing another image memo example when image memo is checked in the check process in FIG. 32.

In FIG. 35, a check screen of the schedule expressed by an exclamation mark 31 in the July 2 date box is displayed; the paper space image memo "NEWS OF SECOND PARTY OF BETTY SMITH WEDDING CEREMONY (AT HOTEL CASTLE AT 16 O'CLOCK ON JULY 2" received by mail (postcard) is displayed on a subscreen (window) 208.

If the facsimile is called during the image memo checking, the modem 204 detects the facsimile being called and the interrupt controller 10 interrupts the CPU 1 for displaying the event on the display screen 20 to inform the user that the facsimile is being called. In this case, a busy signal can also be returned to the facsimile calling party. A message of "CHECKING IMAGE MEMO" can be returned to the facsimile calling party for indicating to the calling party that facsimile transmission is enabled immediately after the user ends checking the image memo. However, the facsimile machine of the calling party may or may not be able to read the message and connection to the facsimile calling party imposes a charge on the calling party.

Therefore, preferably the user system makes the line busy.

Further, to add an image memo topic to an already registered image memo, the user can touch ADD 72 in FIG. 33. To terminate the image memo check process and return to the normal mode shown in FIG. 23, the user can touch RETURN 575. Of course, the user can touch the keys even while he or she checks image memos through the interrupt controller 10.

Next, a function for informing the user of a registered schedule will be described in conjunction with SET ALARM 78 in FIG. 23.

For example, to inform the user of the schedule "ARRANGEMENT AS TO WEDDING CEREMONY (ARRANGEMENT AT WEST CHURCH AT 10 O'CLOCK ON JULY 1)" at 1530 hours on Jun. 30, 1993, the user touches SET ALARM 78 after registering the image memo. Next, the user touches DATE SPECIFICATION 79 and enters 19930630 (Jun. 30, 1993), then touches TIME SPECIFICATION 25 and enters 1530 (1530 hours), whereby the data "19930630-1530" is set in the alarm data column in the schedule data management table D 536.

On the other hand, the timer management section 83 in FIG. 22 periodically references the alarm data column in the schedule data management table D 536. If the current time of day matches the setup time, the timer management section 83 informs the user by producing a warning beep or blinking the corresponding symbol on the display screen in FIG. 23.

If the user does not require an alarm and not set it, automatically "00000000-0000" is set in the alarm data column in the schedule data management table D 536, inhibiting the timer management section 83 from performing the alarm information process if the setup time is reached.

For a system not requiring any alarm setting, SET ALARM 78 is not necessary in FIG. 23 and the alarm data column is not required in the schedule data management table D 536 shown in FIG. 25.

Although the user can use the touch keys provided on the screen in FIG. 23 for entry operation, operation buttons are not limited to the touch keys and the user can also use a tablet to select entries displayed on the screen with a pen or finger. Therefore, the display contents on the display screen 20 can also be selected for operation.

Next, a modified embodiment for connecting the system of the invention to a local area network (LAN) for registering a schedule, etc., not only by facsimile, but also by electronic mail using an image will be discussed with reference to FIGS. 36 to 40.

Figure 36:
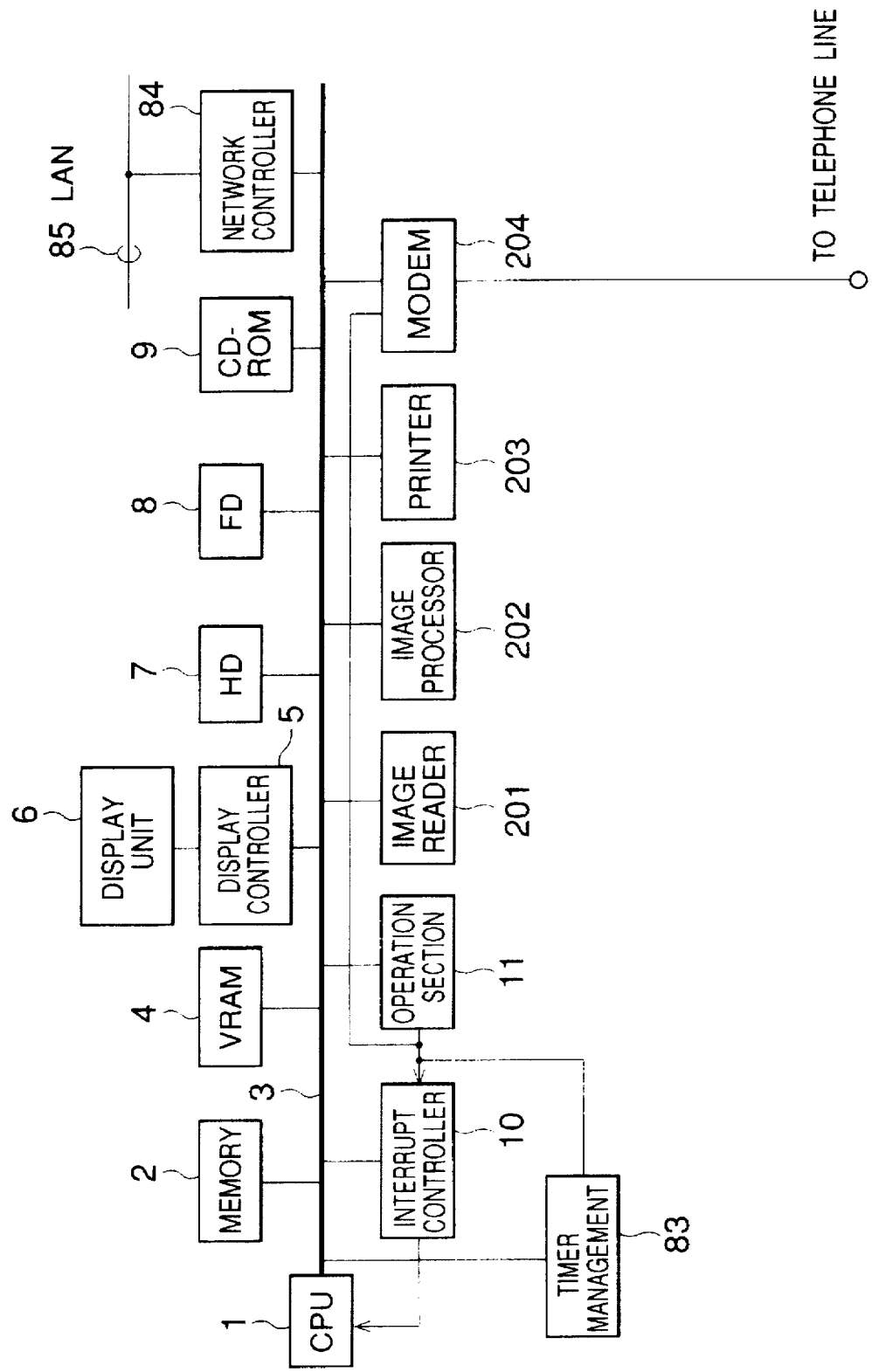
FIG. 36 is a block diagram showing the system configuration according to a modified embodiment provided by adding a network controller to the system in FIG. 22.

The system configuration of the modified embodiment in FIG. 36 is the same as that of the embodiment in FIG. 22 except that it contains a network controller 84 for connecting the embodiment in FIG. 22 to a LAN 85.

Figure 39:
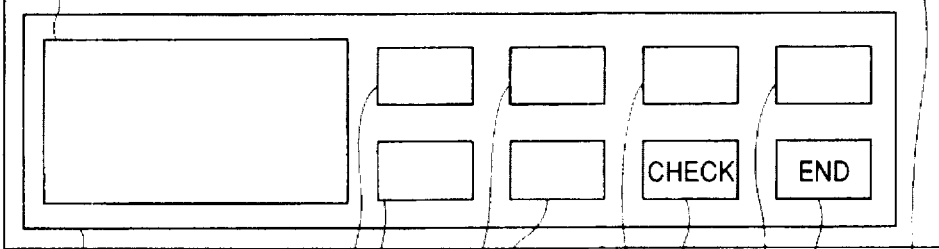
FIG. 39 is an illustration showing a display screen in the system in FIG. 36.

FIG. 37 shows a facsimile number and electronic mail destination address management table 511. FIG. 38 shows a transmission order management table 512 for calling persons (parties) listed in the facsimile/mail management table 511 or transmitting electronic mail to them in order. FIG. 39 is an illustration of a facsimile/mail management display screen for registration in and use of the facsimile/mail management table 511 and the transmission order management table 512.

First, to register a facsimile number in the facsimile/mail management table 511, the user touches FAX NUMBER 506 in FIG. 39, then touches REGISTER 103 and enters a name and facsimile number by finger or pen operation.

To register a mail address in the facsimile/mail management table 511, likewise, the user touches MAIL ADDRESS 105 on the screen in FIG. 13, then touches REGISTER 103 and enters a name and mail address by finger or pen operation. Here, the facsimile/mail management table 511 can be stored in the memory 2 or the HD 7 in FIG. 36 or on a floppy disk through the FD 8.

To execute facsimile or electronic mail transmission, the user touches FAX NUMBER 506 or MAIL ADDRESS 105 in FIG. 39 to display the facsimile/mail management table 511 in a display area 23 in FIG. 39. At the time, the facsimile/mail management table 511 is read from the memory 2, HD 7, or FD 8 for reference and display. Next, the user points to the facsimile number or mail address of the desired party in the display area 23 with a finger or a pen, whereby automatically the data (facsimile number or mail address) is looked up in the facsimile/mail management table 511 and connection is made to the desired party via the telephone line if it is facsimile transmission or via the network controller 84 if electronic mail transmission, enabling the user to execute facsimile or electronic mail transmission to the associated party.

The facsimile/mail management table 511 can also be read from CD-ROM where facsimile numbers and mail addresses are stored through the CD-ROM 9.

The display area of the facsimile/mail management table 511 is not limited to the display area 23 and the table 511 can be displayed in any desired area on the display screen 20. To execute facsimile or electronic mail transmission, the user needs only to point to the facsimile number of mail address of the associated party with a finger or a pen in response to the display; the user need not enter the full number or address at each time.

If the user cannot execute facsimile transmission to the desired party due to a communication accident, unforeseen event, etc., at facsimile transmission, the user touches SELECT FAX/MAIL 501. Then, the system looks up the mail address in the facsimile/mail management table 511 from the facsimile number, then automatically transmits electronic mail to the desired party.

Further, to eliminate the need for the user to touch SELECT FAX/MAIL 501 for starting the process, the system can also request the user to execute all steps in order and perform processing as the user responds to the requests. In this case, SELECT FAX/MAIL 501 is made unnecessary, needless to say.

By the way, the user might want to execute facsimile or electronic mail transmission to a number of parties in order. In this case, the user can previously register the desired parties in the transmission order management table 512 in FIG. 38 for simplifying the facsimile or electronic mail transmission sequence.

To do this, first the user touches SET TRANSMISSION ORDER 104 in FIG. 39, then FAX NUMBER 506 or MAIL ADDRESS 105 for displaying the facsimile/mail management table 511 in the display area 23, then sets the transmission order by finger or pen operation in the transmission order management table 512.

Thus, after the transmission order management table 512 is displayed in the display area 23 at transmission, the user can start transmission by finger or pen operation for transmitting in order of transmission order management numbers K01, K02, . . . . However, the user can touch ARRANGE DATA INPUT 107 in FIG. 33 and change data under the arrange data column in the transmission order management table 512 from "00" to "01" to skip some persons (parties) listed in the transmission order management table 112 in the transmission sequence. Relating the arrange data "01" to persons to be skipped and "00" to those to whom transmission is to be executed is an example; any other data values may be used if whether or not transmission is required can be specified.

Figure 40:
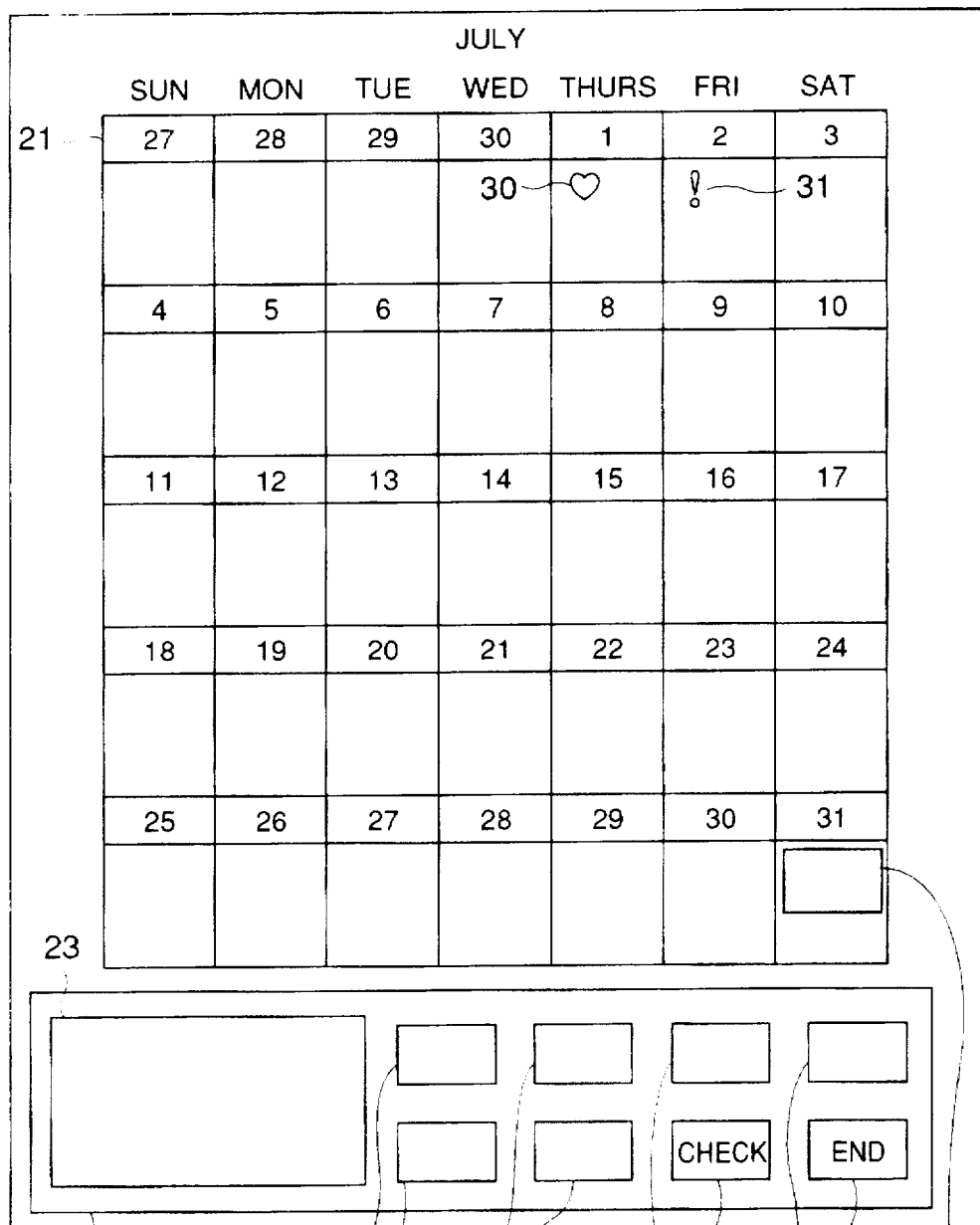
FIG. 40 is an illustration showing another display screen in the system in FIG. 22.

Image data received by facsimile or image data on the paper space of a postcard, letter, or the like read by the image reader 201 is used as image information of an image memo, but data received by electronic mail can also be used as image information. In a system which does not have the image reader 201, the basic display screen as shown in FIG. 40 may be used.

Next, embodiments for executing facsimile transmission/reception using a portable telephone of mobile communication, etc., rather than via a wire telephone line will be discussed.

Figure 47:
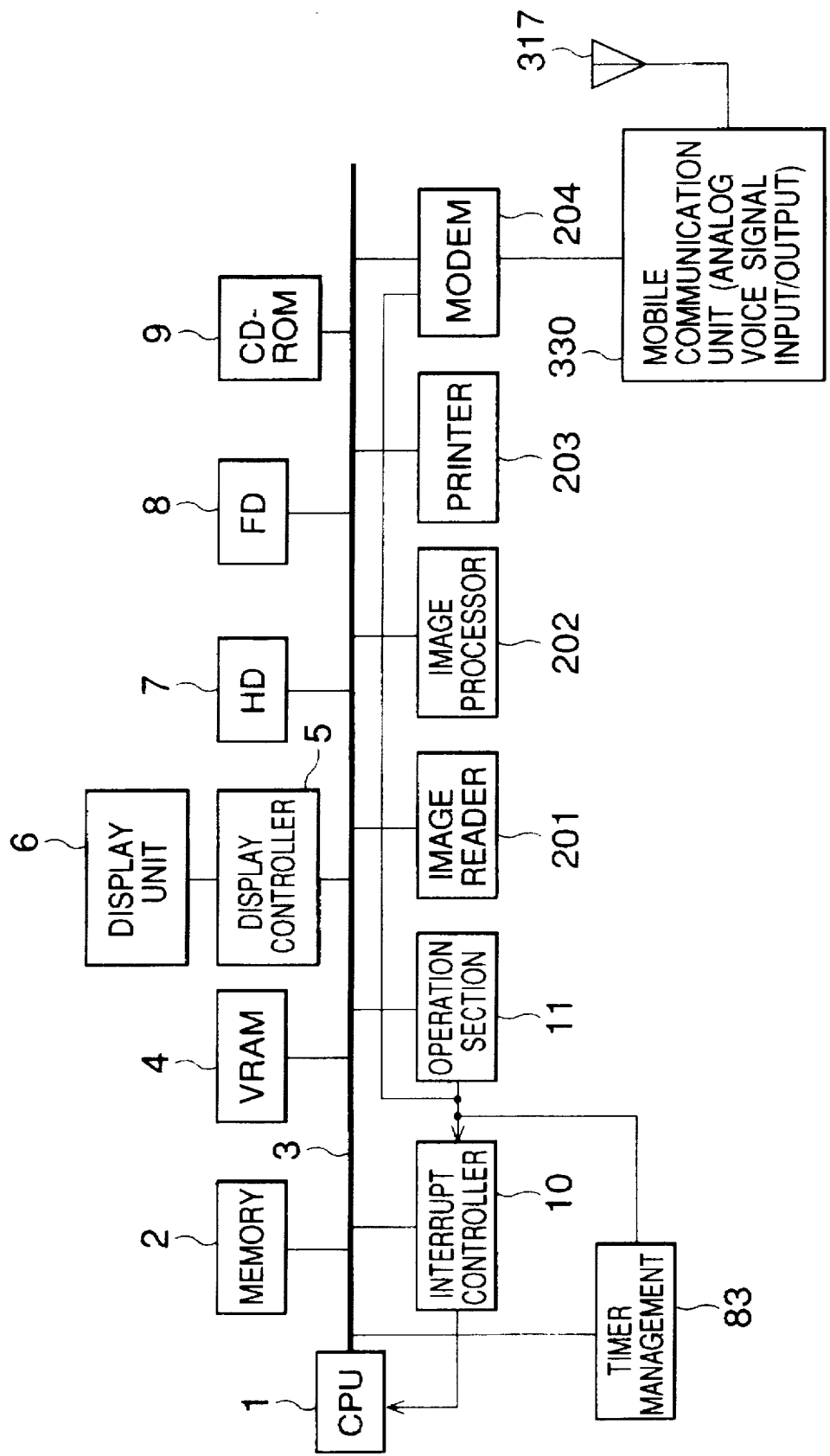
FIG. 47 is a block diagram showing the system configuration according to another embodiment of the invention.

FIG. 47 is a block diagram of a system in which a modem 204 is connected to a mobile communication unit for transferring image data, etc., in the form of analog voice signal. In the embodiment in FIG. 47, analog voice data handled by the modem 204 is used as it is, thus the member to which the modem 204 in FIG. 22 is connected needs only to be changed from a telephone line to a mobile communication unit 330 provided with analog voice signal input/output terminals; the embodiment system can be provided easily.

Figure 48:
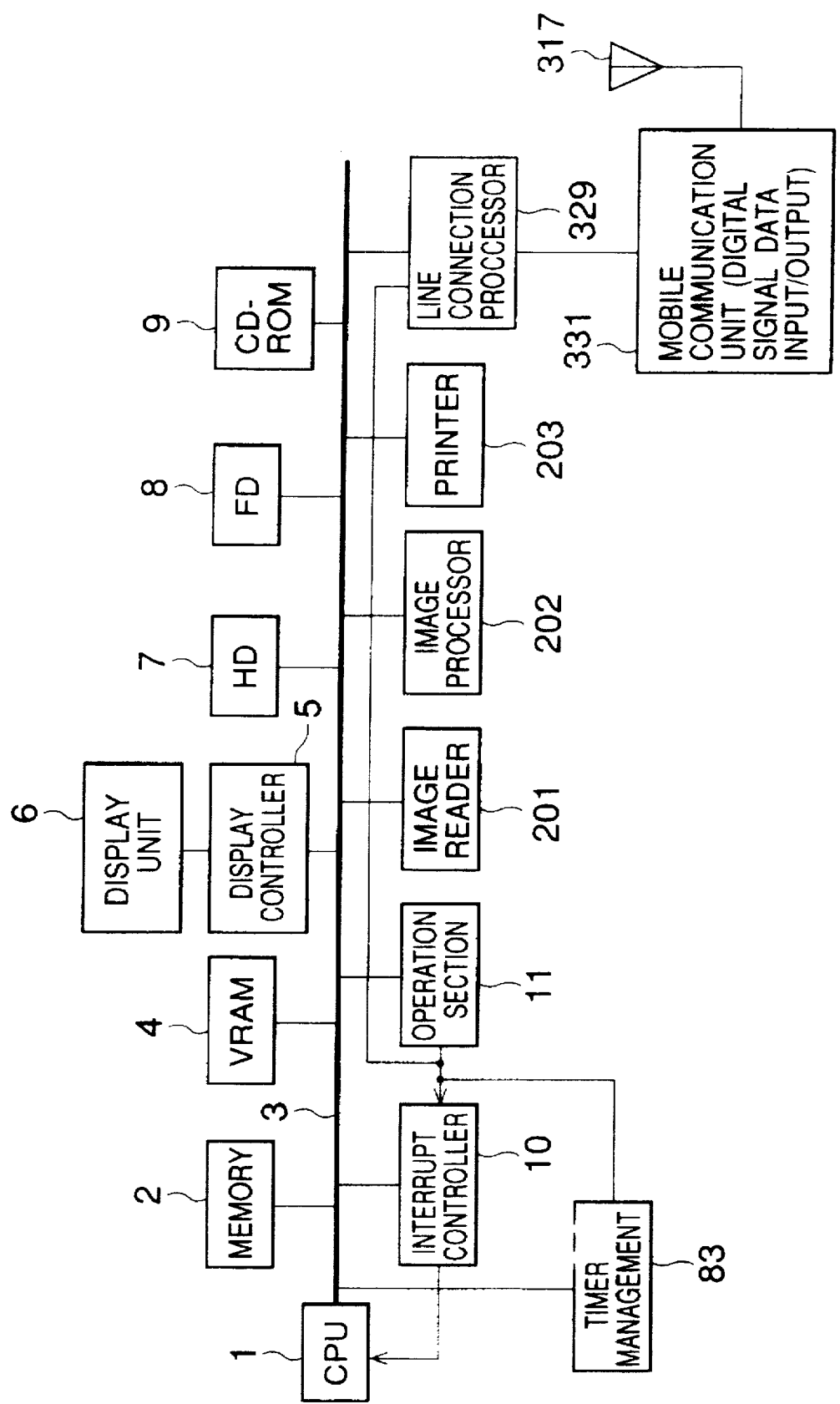
FIG. 48 is a block diagram showing the system configuration according to another embodiment of the invention.

FIG. 48 shows an embodiment characterized by the fact that a line connection processor 329 is provided in place of the modem 204. The line connection processor 329 enables transfer of image data by checking facsimile data specifications and paper size with the associated unit to and from which image data is transferred and matching the protocol between the home and associated systems. However, the line connection processor 329, which inputs and outputs data in the form of digital signal, cannot be connected to a normal telephone line. However, it can be connected to a mobile communication unit that enables data input/output in the form of digital signal. Unlike the modem 204, it eliminates the need for converting image data into an analog voice signal; the system configuration is simplified.

According to the embodiments, the user can directly make the most of image information received by facsimile, paper space of a postcard, letter, etc., and image information of electronic mail without performing complicated operation at a conventional input device, so that the user can enter the schedule contents promptly. Since the user directly enters conversation, electronic mail voice information, etc., in the system, the system enables the user to avoid an input error which may occur if he or she handles conventional input devices, enabling the user to enter a schedule accurately.

We have discussed the embodiments for transferring information using telephones, mobile communications, facsimiles, etc. However, the invention is not limited to them. That is, the invention can be applied to communication systems that can transfer information regardless of wire or radio or transmission systems.

What is claimed is:

1. An information processing system which provides a schedule management function for displaying a schedule on a display unit, said system comprising:

a display unit for displaying a schedule having regions corresponding to a plurality of dates;

means for inputting at least one voice signal;

means for converting said at least one voice signal into digital data;

means for assigning an identifier to said digital voice signal data;

means for storing said digital voice signal data associated with said identifier;

means for inputting a date associated with said digital voice signal data;

display control means for displaying a symbol related to said identifier in a region in said schedule corresponding to the inputted date; and processed voice signal output means, responsive to the schedule region in which the symbol is displayed, for converting the digital voice signal data into a processed voice signal and outputting said processed voice signal;

wherein said processed voice signal output means has both a loudspeaker and network control means, said network control means connected to a communication system for outputting said processed voice signal to the communication system.

2. The information processing system as claimed in claim 1 further including switch means for selecting either one of a secret mode for outputting said processed voice signals only to said loudspeaker and an open mode for outputting said processed voice signals to both said loudspeaker and said network control means.

3. The information processing system as claimed in claim 1, wherein a plurality of users use the schedule management function, said system further including;

means for storing received digital voice signal data together with an identifier for identifying said user when one user receives a call from another user; and means for retrieving said digital voice signal data using the identifier for identifying said user.

4. An information processing system which provides a schedule management function for displaying a schedule on a display unit, said system comprising:

a display unit for displaying a schedule having regions corresponding to a plurality of dates;

means for inputting at least one voice signal;

means for converting said at least one voice signal into digital data;

means for assigning an identifier to said digital voice signal data;

means for inputting a date and a time associated with said digital voice signal data;

means for storing said digital voice signal data along with said assigned identifier and said data corresponding to the date and time said voice signal was entered;

means for retrieving digital voice signal data by using said date and time entry data;

display control means for displaying a symbol related to said identifier in a region in said schedule corresponding to the inputted date; and processed voice signal output means responsive to the schedule region in which the symbol is displayed, for converting the digital voice signal data into a processed voice signal and outputting said processed voice signal.

5. An information processing system which provides a schedule management function for displaying a schedule on a display unit, said system comprising:

a display unit for displaying a schedule having regions corresponding to a plurality of dates;

means for inputting at least one voice signal, said voice signal input means further includes an echo cancellation means for preventing an echoing sound in said voice signal when said signal voice is outputted from a processed voice signal output means:

means for converting said at least one voice signal into digital data:

means for assigning an identifier to said digital voice signal data;

means for storing said digital voice signal data associated with said identifier;

means for inputting a date associated with said digital voice signal data; and display control means for displaying a symbol related to said identifier in a region in the schedule corresponding to the inputted date;

whereby said processed voice signal output means is responsive to the schedule region in which the symbol is displayed and converts the digital voice signal data into a processed voice signal and outputs said processed voice signal.

6. An information processing system which provides a schedule management function, comprising:

a display unit for displaying a schedule of a plurality of dates;

a reception device for receiving transmitted voice signals via a communication system;

a voice input means for inputting voice signals and said transmitted voice signals;

an analog/digital converter for converting said voice signals and said transmitted voice signals into voice signal data;

an identifier assigning means for assigning an identifier to said voice signal data;

a storage means for storing said voice signal data associated with said identifier;

a data input means for inputting a date association with said voice signal data;

a display control means for displaying a symbol corresponding to said identifier in a display region of said display unit, said display region associated with said inputted date;

a processed voice signal output means, responsive to a specified region where said symbol is displayed, for converting said voice signal data into a processed voice signal and outputting said processed voice signal;

a loudspeaker; and a network control means connected to said communication system;

wherein said processed voice signal output means outputs said processed voice signal to said loudspeaker and to said communication system.

7. An information processing system according to claim 6, further comprising:

a switch means for selecting one of a secret mode for outputting said processed voice signals to said loudspeaker and one of an open mode for outputting said processed voice signal to said loudspeaker and to said communication system.

8. An information processing system according to claim 6 wherein said storage means further comprises a retrieving means for retrieving said stored voice signal data using said assigned identifier.

9. An information processing system according to claim 6, further comprising: an echo cancellation means for preventing an echoing sound in said input voice signal when said input voice signal is being outputted from said processed voice signal output means.

10. An information processing system according to claim 6, further comprising means for returning a busy tone to an external system upon receipt of a connection request received from said external system during the outputting of said processed voice signal by said processed voice signal outputting means.

11. An information processing system which provides a schedule management function, comprising:

a display unit for displaying a schedule of a plurality of dates;

a reception device for receiving transmitted voice signals via a communication system;

a voice input means for inputting voice signals and said transmitted voice signals.

an analog/digital converter for converting said voice signals and said transmitted voice signals into voice signal data;

an identifier assigning means for assigning an identifier to said voice signal data;

a storage means for storing said voice signal data associated with said identifier;

a data input means for inputting a date and time association with said voice signal data;

a display control means for displaying a symbol corresponding to said identifier in a display region of said display unit, said display region associated with said inputted date;

a processed voice signal output means, responsive to a specified region where said symbol is displayed, for converting said voice signal data into a processed voice signal and outputting said processed voice signal;

said storing means stores said digital voice signal data along with said assigned identifier and said data corresponding to the date and time said voice signal was entered; and means for retrieving digital voice signal data by using said date and time entry data.

12. An information processing system which provides a schedule management function for displaying a schedule on a display unit, said system comprising:

a display unit for displaying a schedule having regions corresponding to a plurality of dates;

means for inputting at least one voice signal, wherein said voice input signal means includes a least either one of a voice signal input device for inputting said voice signal of a user of the schedule management function and a network control means connected to a communication system for receiving a transmitted voice signal;

means for converting said voice signals and said transmitted voice signals into digital data;

means for assigning an identifier to said digital voice signal data;

means for storing said digital voice signal data associated with said identifier;

means for inputting a date associated with the digital voice signal data;

display control means for displaying a symbol related to said identifier in a region in the schedule corresponding to the inputted date;

processed voice signal output means, responsive to the schedule region in which the symbol is displayed, for converting the digital voice signal data assigned the identifier related to the symbol into a processed voice signal and outputting said processed voice signal; and means for returning a busy tone to an external system upon reception of a connection request from said external system via the communication system after said processed voice signal output means converts said digital voice signal data and outputs said processed voice signal.

* * * * *